US012440397B2

(12) United States Patent
Menna et al.

(10) Patent No.: US 12,440,397 B2
(45) Date of Patent: Oct. 14, 2025

(54) SYSTEM FOR LOADING/UNLOADING AN AMBULANCE STRETCHER ONTO/FROM AN AMBULANCE

(71) Applicant: STEM S.R.L., Medesano (IT)

(72) Inventors: Ezio Menna, Collecchio (IT); Michele Corradi, Parma (IT)

(73) Assignee: STEM S.R.L., Medesano (IT)

(*) Notice: Subject to any disclaimer, the term of this patent is extended or adjusted under 35 U.S.C. 154(b) by 305 days.

(21) Appl. No.: 17/938,097

(22) Filed: Oct. 5, 2022

(65) Prior Publication Data

US 2023/0113855 A1 Apr. 13, 2023

(30) Foreign Application Priority Data

Oct. 7, 2021 (IT) ........................ 102021000025517

(51) Int. Cl.
*A61G 3/02* (2006.01)
*A61G 1/013* (2006.01)
(Continued)

(52) U.S. Cl.
CPC ........... *A61G 3/0272* (2013.01); *A61G 1/013* (2013.01); *A61G 1/0212* (2013.01); *A61G 1/0562* (2013.01); *A61G 3/0254* (2013.01); *A61G 3/0883* (2013.01); *A61G 2203/20* (2013.01); *A61G 2203/40* (2013.01)

(58) Field of Classification Search
CPC .... A61G 3/0272; A61G 1/013; A61G 1/0212; A61G 1/0562; A61G 3/0254; A61G 3/0883; A61G 2203/20; A61G 2203/40; A61G 2203/30; A61G 2203/42;
(Continued)

(56) References Cited

U.S. PATENT DOCUMENTS 5,092,722 A * 3/1992 Reazer, III ............... A61G 1/06 410/104
8,439,416 B2 * 5/2013 Lambarth ................ A61G 1/00 296/20

(Continued)

FOREIGN PATENT DOCUMENTS

WO 2004064698 A2 8/2004
WO 2011088169 A1 7/2011

*Primary Examiner* — Joseph D. Pape
(74) *Attorney, Agent, or Firm* — FisherBroyles, LLP; Roger L. Browdy; Ronni S. Jillions

(57) ABSTRACT

An ambulance stretcher, including a support frame for supporting a patient; a pair of front and rear legs, each having a front and rear wheel, respectively; an actuation arrangement provided with front and rear actuators, which move the front and rear legs, respectively; a front coupling body connected to the support frame; a control unit of the coupling body including a first sensor configured to detect a correct positioning of the coupling body in a respective support coupling of an automatic loading/unloading apparatus of an ambulance, a second sensor configured to detect a load bearing on the coupling body; a release arrangement configured to operate a release between the coupling body and the support coupling; and an electronic control unit configured to actuate one of the actuation arrangement and the release arrangement as a function of a signal received from the first and/or second sensor of the control unit.

15 Claims, 16 Drawing Sheets

(51) Int. Cl.
*A61G 1/02* (2006.01)
*A61G 1/056* (2006.01)
*A61G 3/08* (2006.01)

(58) Field of Classification Search
CPC .... A61G 1/0237; A61G 1/056; A61G 3/0875; A61G 3/0218; A61G 3/0245; A61G 3/0891
USPC .............................................................. 296/20
See application file for complete search history.

(56) References Cited

U.S. PATENT DOCUMENTS

| | | | | |
|---|---|---|---|---|
| 2017/0172819 | A1* | 6/2017 | Bourgraf .............. | A61G 1/0562 |
| 2018/0250178 | A1* | 9/2018 | Paul ..................... | A61G 7/0528 |
| 2021/0196546 | A1 | 7/2021 | Mansfield | |

* cited by examiner

SYSTEM FOR LOADING/UNLOADING AN AMBULANCE STRETCHER ONTO/FROM AN AMBULANCE

TECHNICAL FIELD

The present invention relates to a stretcher (for transporting and/or loading/unloading patients), preferably an ambulance stretcher and a relative system for loading/unloading the stretcher onto/from an ambulance loading plane.

More particularly, the present invention a stretcher of an automatic, semi-automatic or power-assisted type and the relative automatic, semi-automatic or power-assisted loading/unloading system.

PRIOR ART

As is well known, there is a variety of stretchers for transporting patients in emergencies in use. Such stretchers can be designed to transport and load/unload patients onto/from an ambulance.

Known stretchers have a fair degree of automation that allows to facilitate the loading/unloading operations of the patient onto/from the ambulance for the operator in charge and to control these operations in order to make them as safe as possible.

A need felt in the industry is to improve the safety of such loading/unloading operations, as well as to facilitate and alleviate the tasks of the loading/unloading personnel, e.g. by allowing such loading/unloading and transport operations to be carried out by a single operator and/or by relieving the operator of the burden of supporting the stretcher and the relative loads during the entire loading/unloading operation.

In addition, a further need felt in the sector is to facilitate and improve the functionality of the stretcher during the phases of transporting the patient through this stretcher, for example by making it suitable, safe and convenient for use in multiple transport conditions, for example also near ground slopes or other working situations.

An object of the present invention is to satisfy these and other needs of the prior art, within the framework of a simple, rational and low cost solution.

These objects are achieved by the features of the invention set forth in the independent claim. The dependent claims outline preferred and/or particularly advantageous aspects of the invention.

DISCLOSURE OF THE INVENTION

In order to satisfy one or more of the said needs of the prior art, the invention, in particular, makes available an ambulance stretcher, which comprises:

- a support frame for supporting a patient;
- a pair of front legs, each having a front wheel;
- a pair of rear legs, each having a rear wheel;
- an actuation arrangement provided with a front actuator, which moves the pair of front legs and which interconnects the support frame and the pair of front legs, and a rear actuator, which moves the pair of rear legs and which connects the support frame and the pair of rear legs; and
- a front coupling body connected to a front end of the support frame;
- a control unit of the coupling body provided at least a first sensor connected to the coupling body and configured to detect a correct positioning of the coupling body in a respective support coupling of an automatic loading/unloading apparatus of an ambulance, and at least a second sensor connected to the coupling body configured to detect a load bearing on the coupling body;
- at least one release arrangement arranged at the front end of the support frame and configured to operate a release between the coupling body and the support coupling of the loading/unloading apparatus of an ambulance; and
- an electronic control unit operatively connected to the actuation arrangement, to the release arrangement and to the control unit and configured to actuate one between the actuation arrangement and the release arrangement as a function of a signal received from at least one between the first sensor and the second sensor of the control unit.

Advantageously, the coupling body may comprise a spherical or hemispherical coupling head arranged, preferably centred, in a vertical median plane of the support frame.

Advantageously, further, the coupling body may be movable with respect to the support frame with respect to at least a first degree of translational freedom substantially parallel to the support frame, between two horizontal end stroke positions, including one front end stroke and one rear end stroke, and at least a seoond degree of translational freedom substantially orthogonal to the support frame, between two vertical end stroke positions, including one lower end stroke and one upper end stroke.

Preferably, the coupling body may be movable from the front end stroke position to the rear end stroke position in contrast to first spring means and is movable from the lower end stroke position to the upper end stroke position in contrast to second spring means.

Again, the first sensor may be a first switch configured to detect when the coupling body is in its rear end stroke position and/or the second sensor may be a second switch configured to detect when the coupling body is in its upper end stroke position.

Advantageously, then, the stretcher may comprise:

- an operator interface and at least one stretcher operating handle that are connected to a rear end of the support frame, wherein the electronic control unit is operationally connected to the operator interface in order to receive commands therefrom and/or provide information to be made available to an operator.

For the same purposes as above, the invention further makes available a system for loading/unloading an ambulance stretcher onto/from an ambulance loading surface, wherein the system comprises:

- a loading/unloading apparatus for a stretcher that can be associated with the loading surface, wherein the loading/unloading apparatus comprises:
  - at least one guide fixed to the loading surface;
  - a support coupling slidable along the guide fixed to the loading surface between a rear position, wherein it is proximal to a rear opening of the ambulance, a front position, wherein it is distal from the rear opening; and
  - a temporary locking arrangement connected to at least one between the support coupling and the guide and configured to temporarily lock the support coupling to the guide in at least one between the front position and the rear position or both; and
- a stretcher, as described above.

Advantageously, the electronic control unit can be configured to perform a sequence of loading the stretcher onto the loading surface, wherein the loading sequence comprises the steps of:

detecting the correct positioning of the coupling body in the support coupling by means of the first sensor, when the support coupling is in its rear position;

if a correct positioning has been detected, detecting a signal indicative a load bearing on the coupling body by means of the second sensor, and operating the front actuator to raise the front pair of legs on the basis of the indicative signal detected.

Again, the stretcher may comprise an unlocking arrangement configured to unlock the temporary locking arrangement; and wherein the electronic control unit may be operatively connected to the unlocking arrangement and is configured to command the unlocking arrangement to unlock the locking arrangement when the front legs are in a raised end stroke position.

Advantageously, the stretcher may comprise a distance sensor arranged inferiorly to the support frame between the pair of front legs and the pair of rear legs, wherein the distance sensor is configured to detect the position of the support frame with respect to the rear opening of the ambulance; and wherein the electronic control unit may be operatively connected to the distance sensor and is configured to operate the rear actuator to raise the pair of rear legs based on a signal emitted by the distance sensor.

Again, the guide may be provided with safety couplings configured to couple at least a coupling portions of the stretcher when the coupling body engages the support coupling and the support coupling is in the front position and locked therein by the locking arrangement; and wherein the stretcher may comprise a sensor arrangement arranged inferiorly to the support frame, wherein the sensor arrangement is configured to detect a successful coupling of the coupling portions of the stretcher to the safety couplings of the guide and/or of the locking arrangement between the guide and the support coupling; and wherein the electronic control unit may be operatively connected to the sensor arrangement to finish the loading sequence based on a signal emitted by the sensor arrangement.

According to an advantageous aspect of the invention, the electronic control unit may be configured to perform a sequence of unloading the stretcher from the loading surface, wherein the unloading sequence comprises at least the steps of:

detecting a signal indicative of a load bearing on the coupling body by means of the second sensor, when the coupling body is coupled to the support coupling and the support coupling is in its rear position; and operating the release arrangement to operate a release between the coupling body and the support coupling based on the indicative signal detected.

Again, the support coupling may comprise a seat provided with a rear wall, two lead-in side walls and a lower wall, wherein the lead-in side walls preferably converge with each other towards the rear wall.

Advantageously, the support coupling may comprise at least one coupling seat contained between the lead-in side walls, the rear wall, and the lower wall, wherein the coupling seat is adapted to releasably snap into the coupling body of the stretcher and be actuated by the release arrangement for releasing the coupling body from the support coupling.

Again, (although not required as the stretcher has been designed to be able to exhibit the entire control logic by itself and perform the functions safely by itself) the loading/unloading apparatus may comprise a further electronic control unit operable to at least one position sensor associated with at least one between the guide and the support coupling and configured to detect a position of the support coupling in at least one between the rear position and the front position or both, wherein the further electronic control unit is configured to:

detect a position of the support coupling in at least one between the rear position and the front position or both by means of the position sensor;

determine a correct positioning of the support coupling in at least one between the rear and front positions or both; and signal the correct positioning determined to least one operator interface connected to at least one between the loading/unloading apparatus and the stretcher.

BRIEF DESCRIPTION OF THE DRAWINGS

Further features and advantages of the invention will be more apparent after reading the following description provided by way of a non-limiting example, with the aid of the accompanying drawings.

BEST MODE TO IMPLEMENT THE INVENTION

Figure 1:
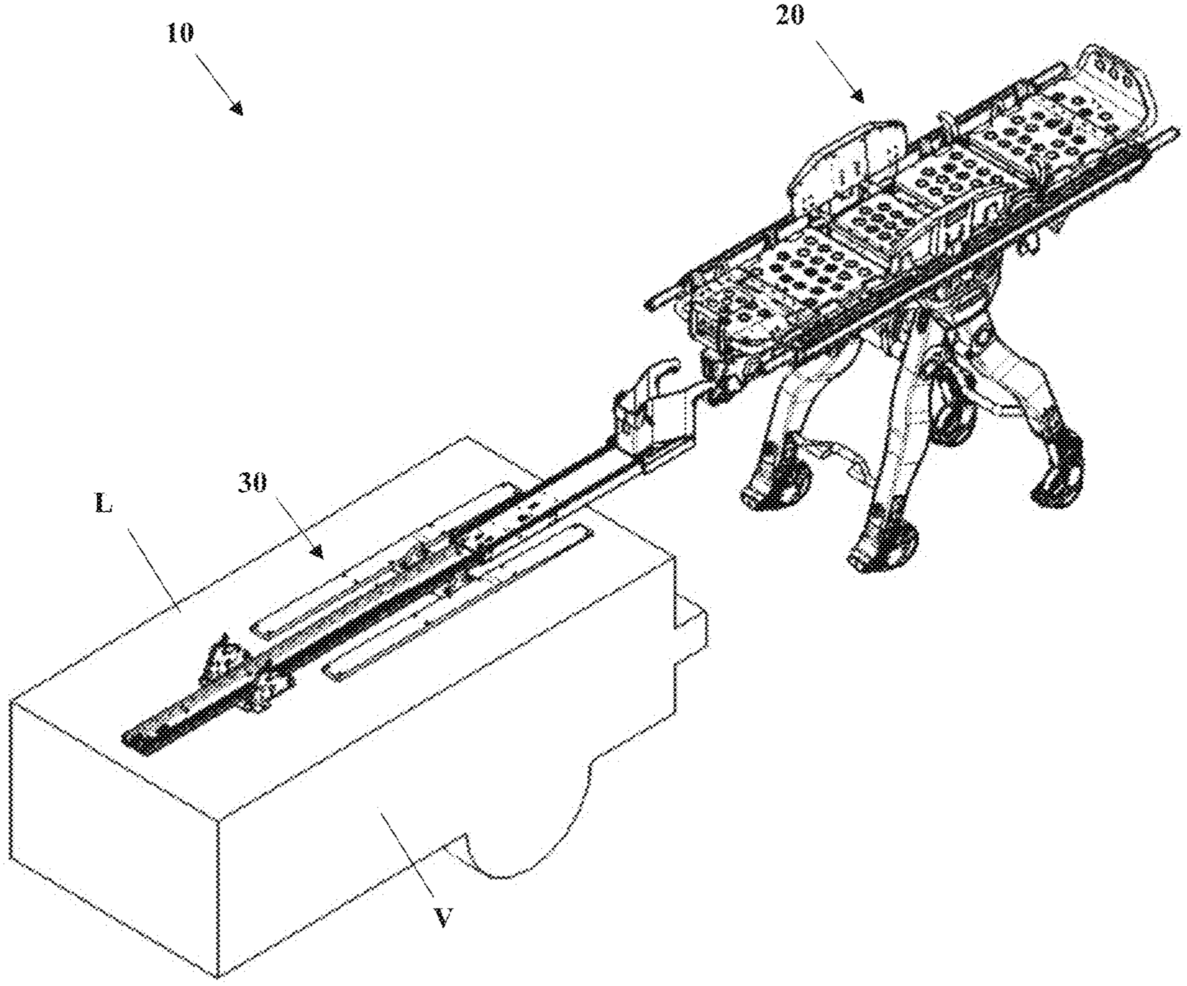
FIG. 1 is an axonometric view of a system according to the invention.
Figure 4:
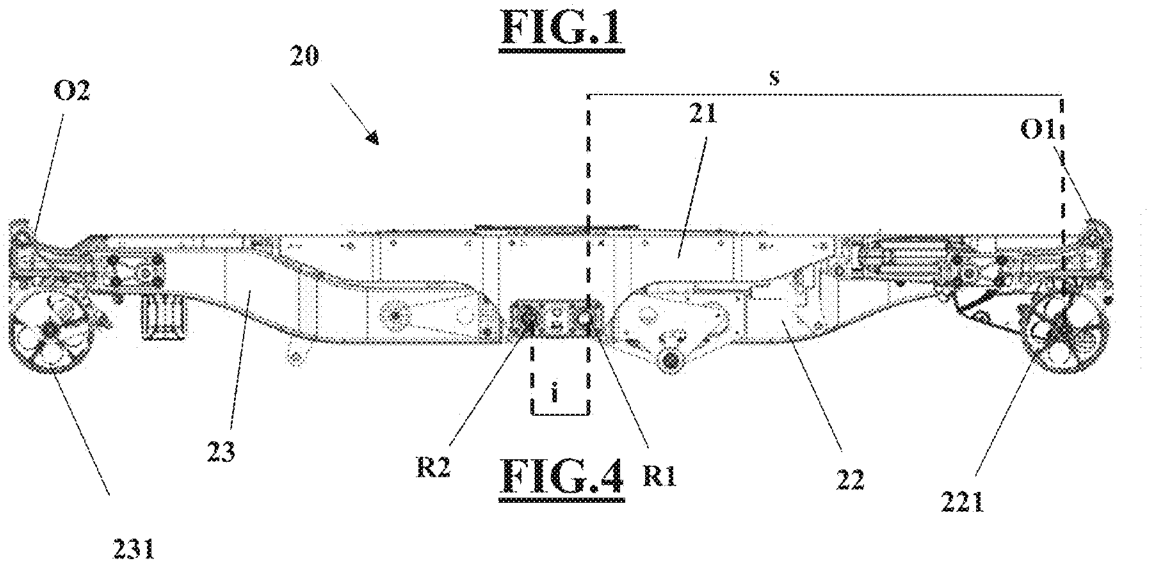
FIG. 4 is a side view of FIG. 2 with raised legs.
Figure 2:
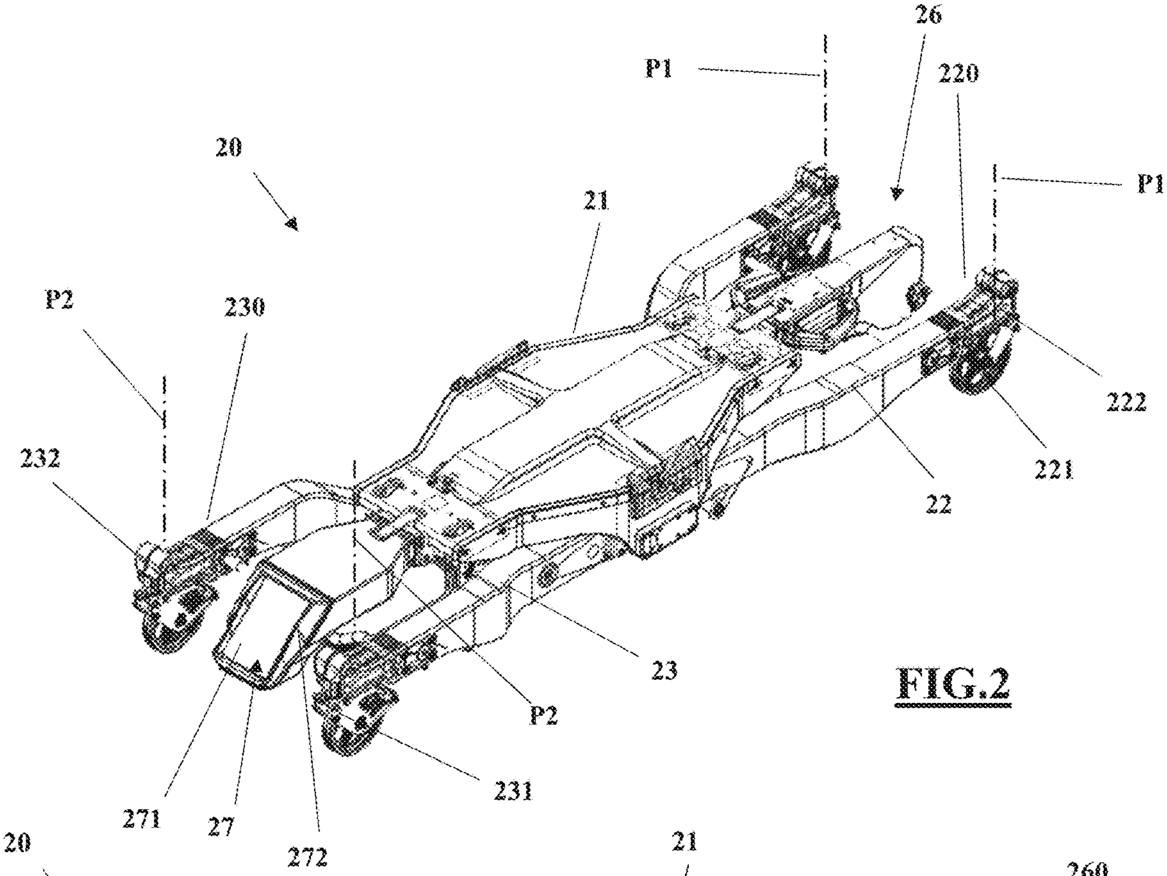
FIG. 2 is an axonometric view of a stretcher according to the invention.
Figure 3:
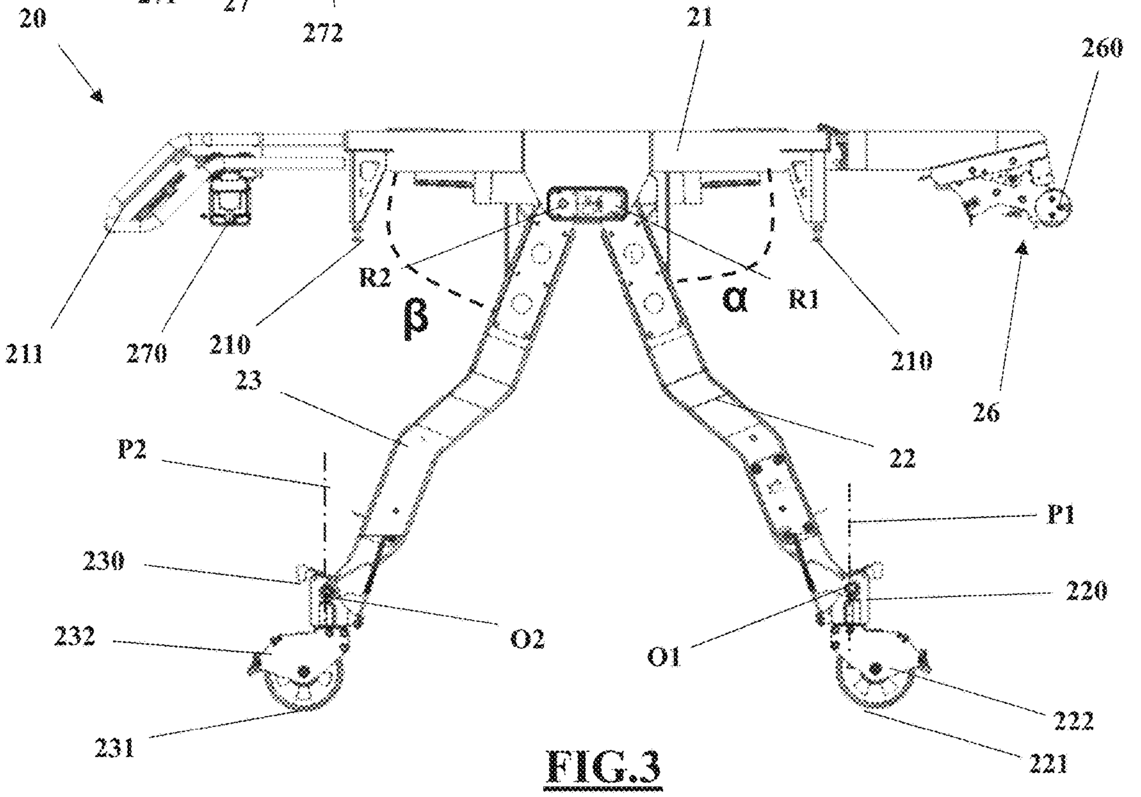
FIG. 3 is a side view of FIG. 2 with lowered legs.
Figure 5:
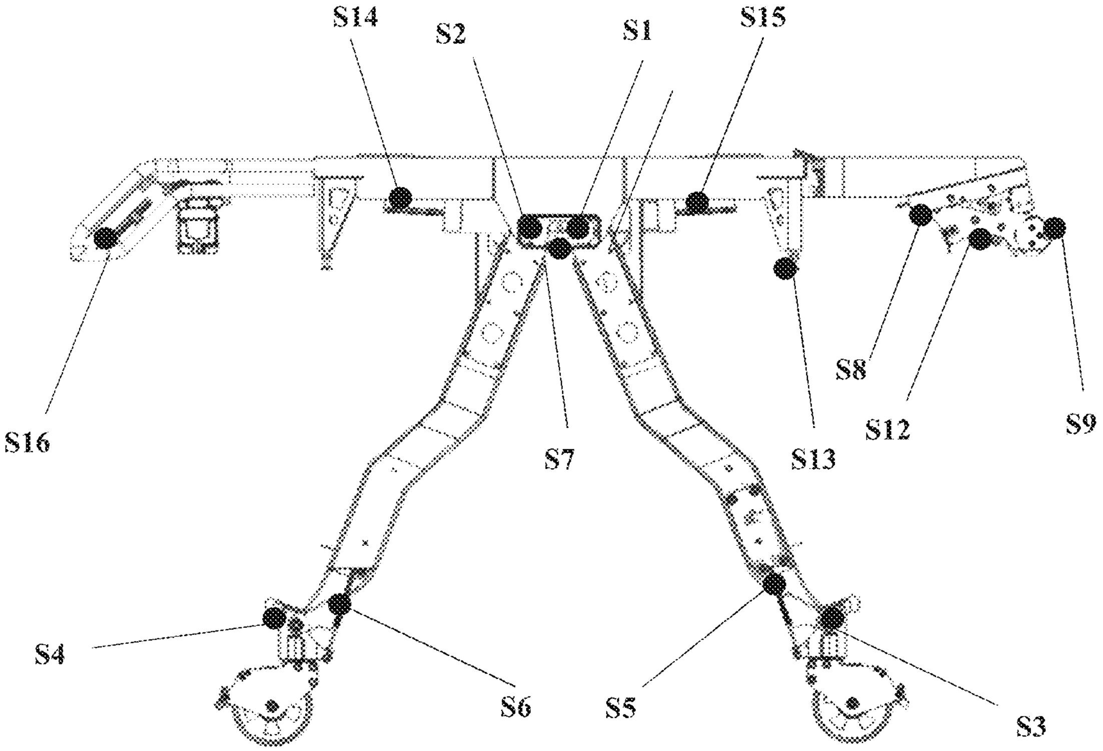
FIG. 5 is a schematic view of the stretcher with some sensors of the sensor arrangement thereof highlighted.
Figure 6A:
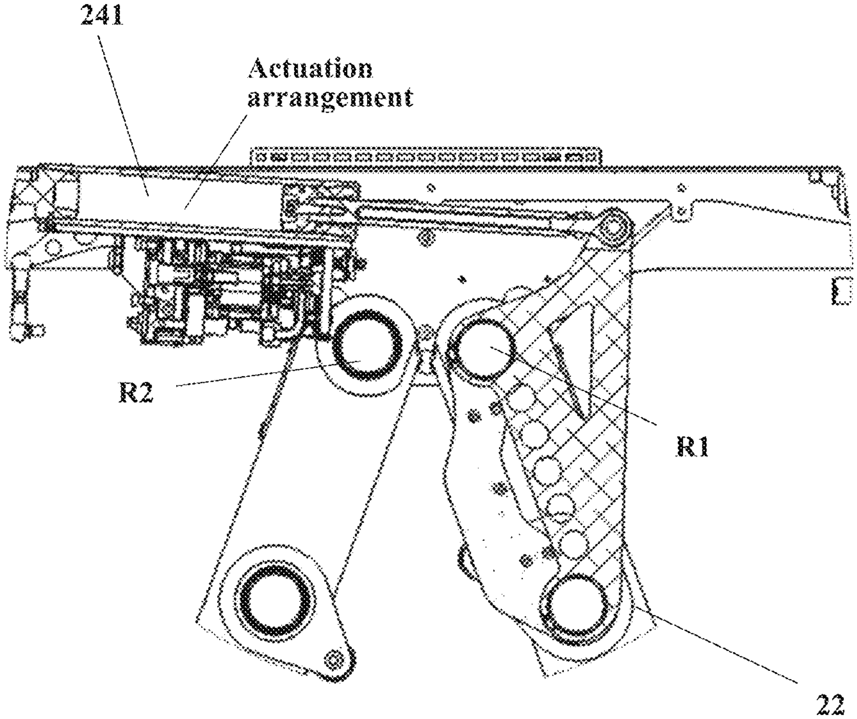
FIGS. 6A and 6B are views in partial medial section of the stretcher in FIG. 2.
Figure 6B:
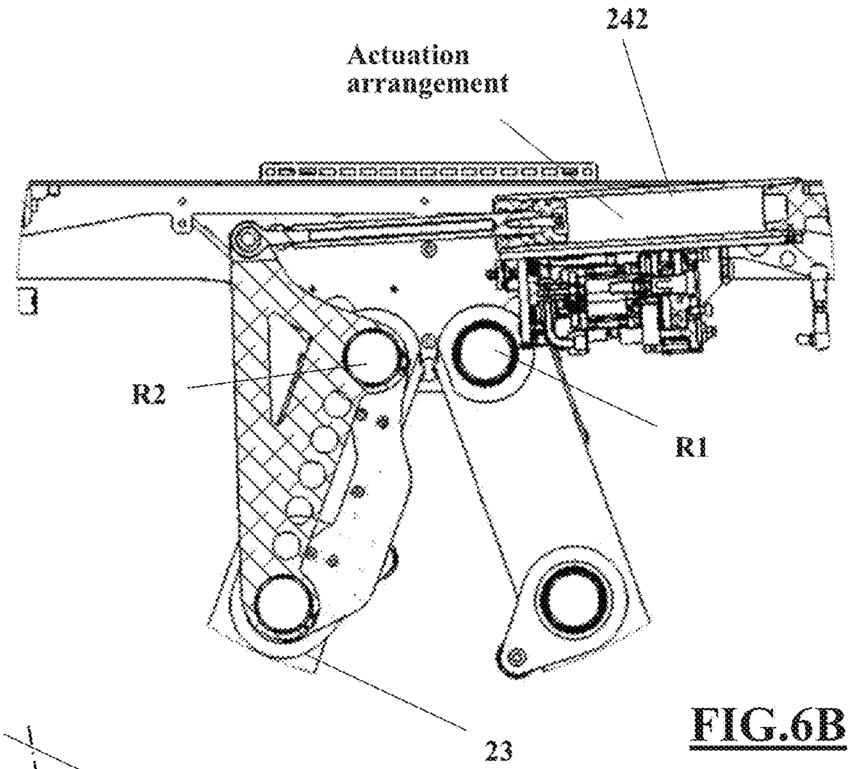
Figure 7A:
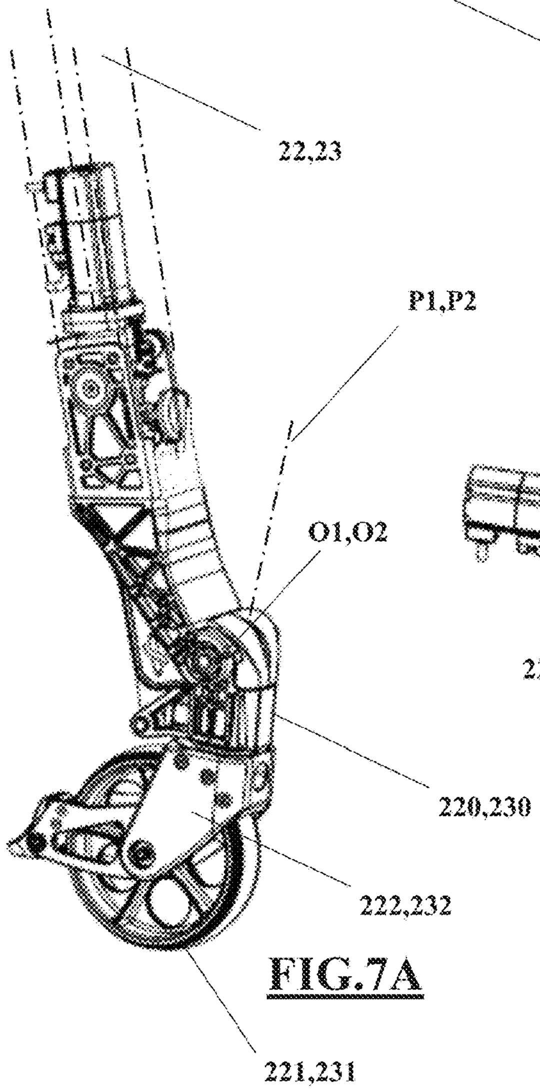
FIGS. 7A and 7B are axonometric views of a portion of the stretcher legs according to the invention, in the lowered position and in the raised position respectively.
Figure 7B:
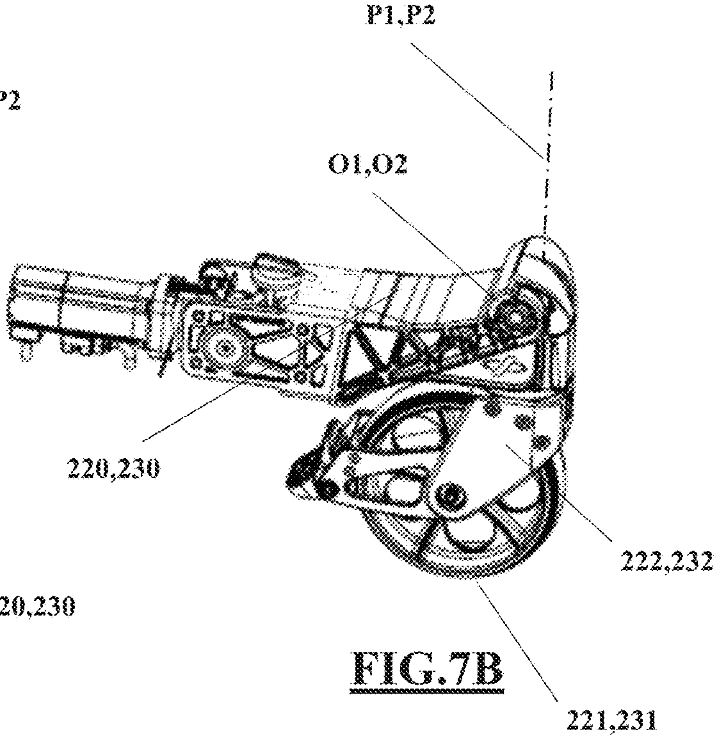
Figure 8A:
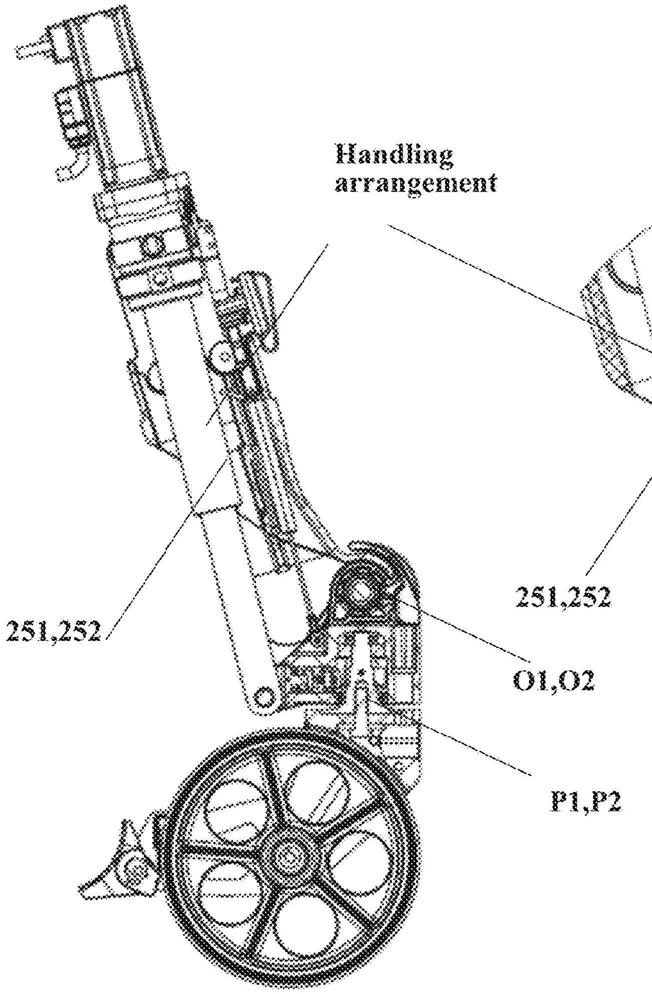
FIGS. 8A and 8B are sectional views of a leg (of FIG. 7A).
Figure 8B:
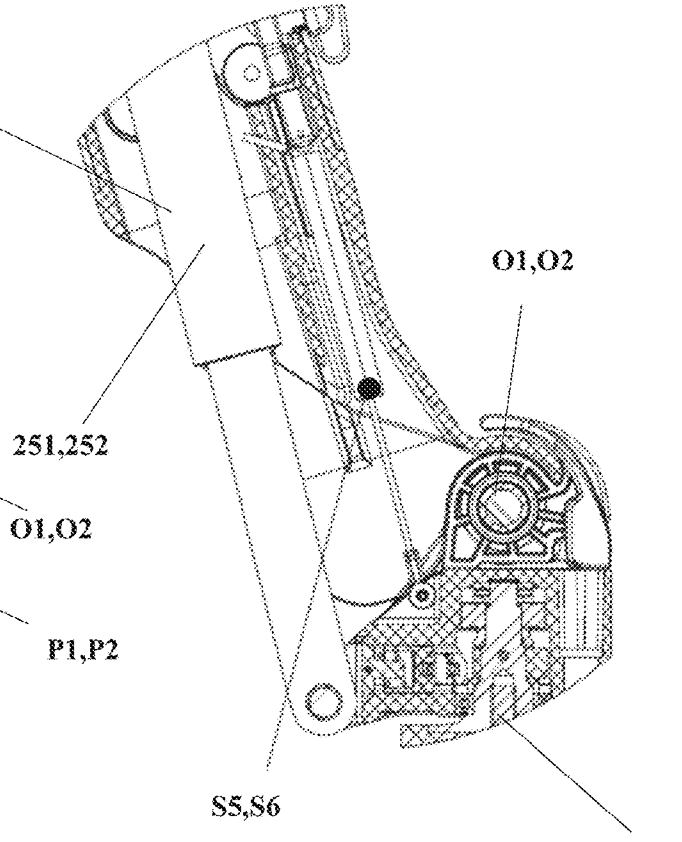
Figure 9:
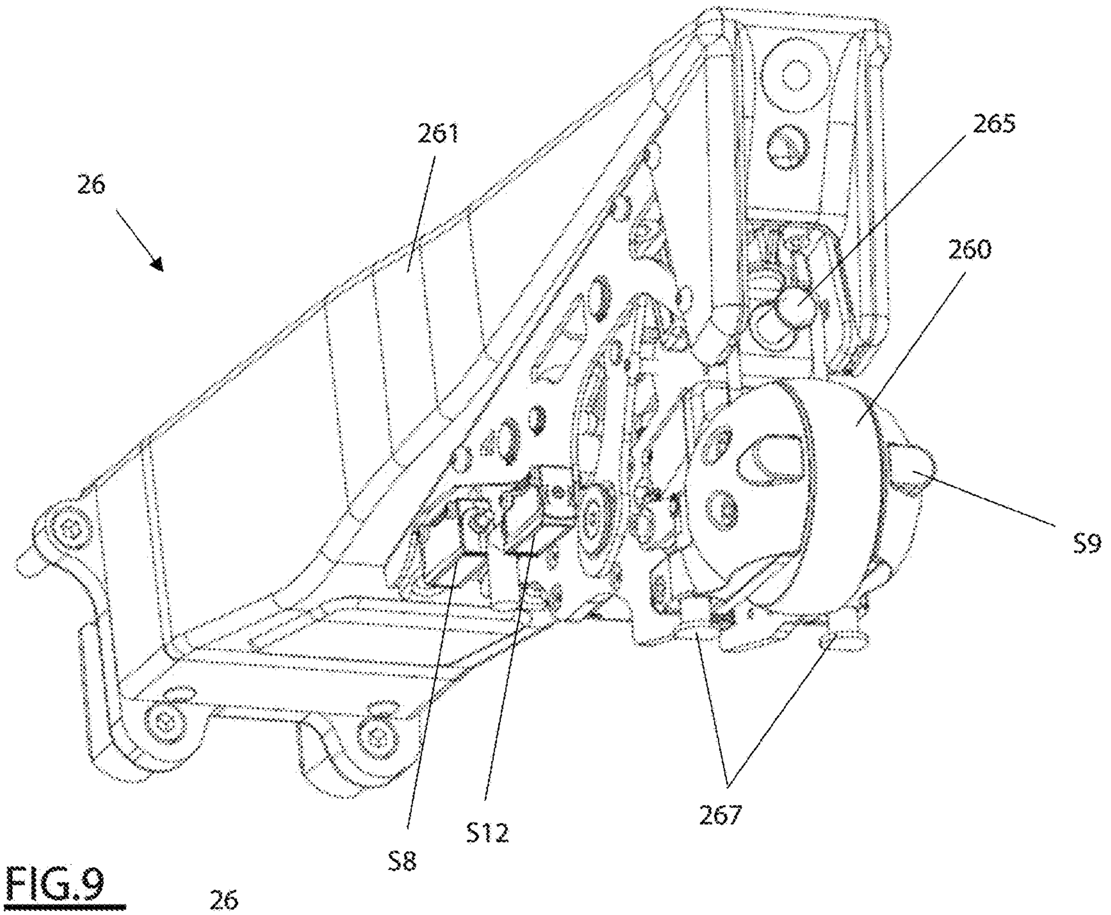
FIG. 9 is an antero-inferior axonometric view of a coupling body of the stretcher according to the invention.
Figure 10A:
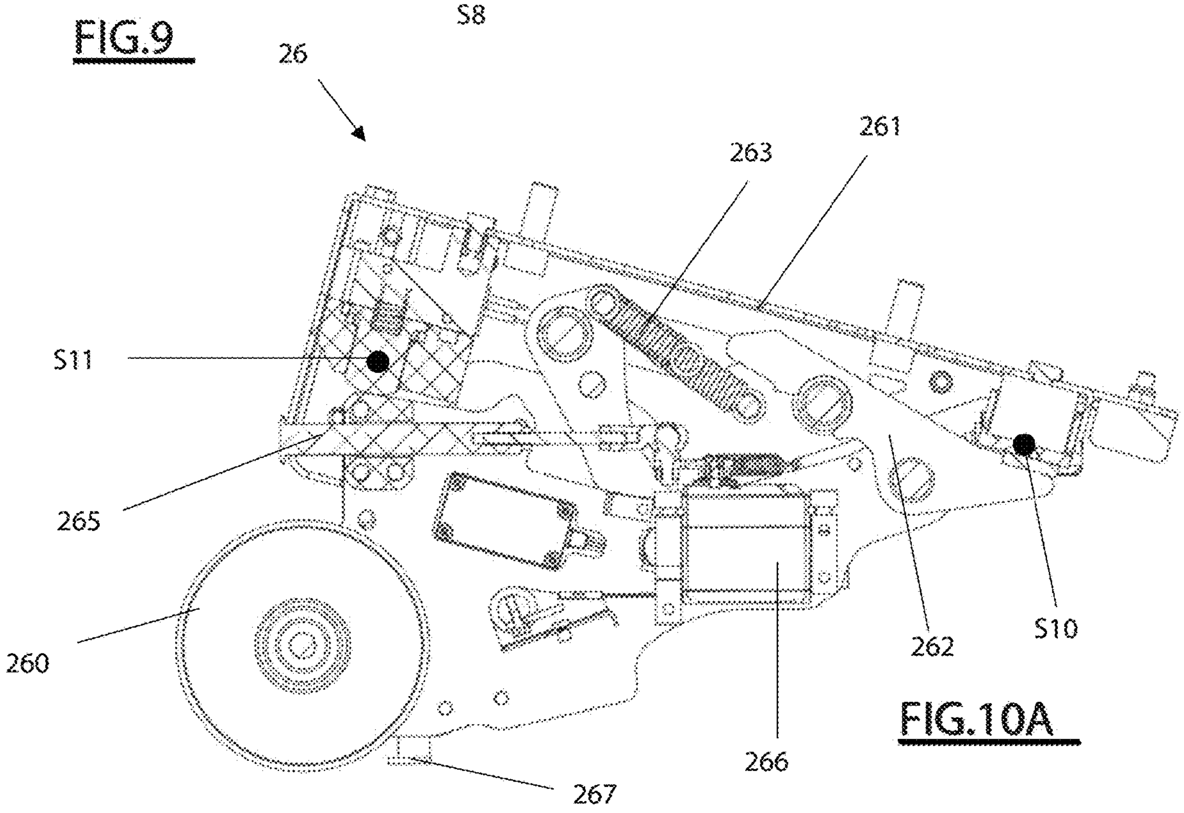
FIGS. 10A and 10B are sectional views of the coupling body in FIG. 9.
Figure 10B:
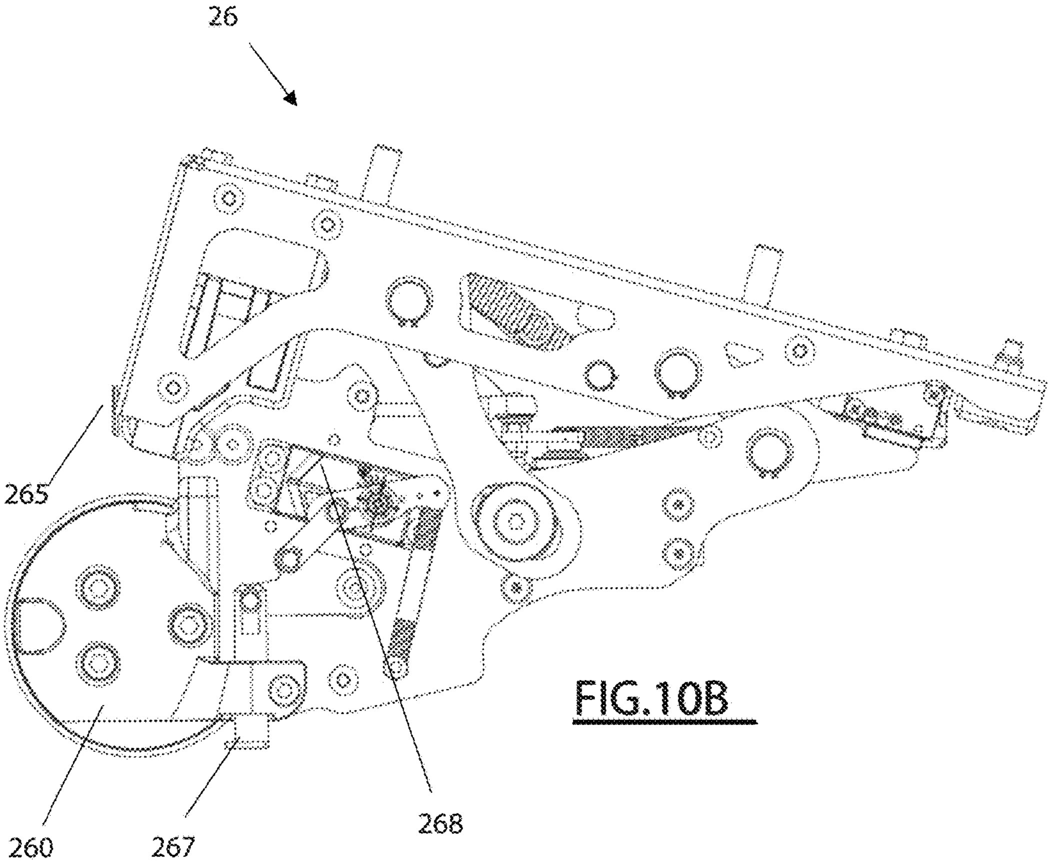
Figure 11A:
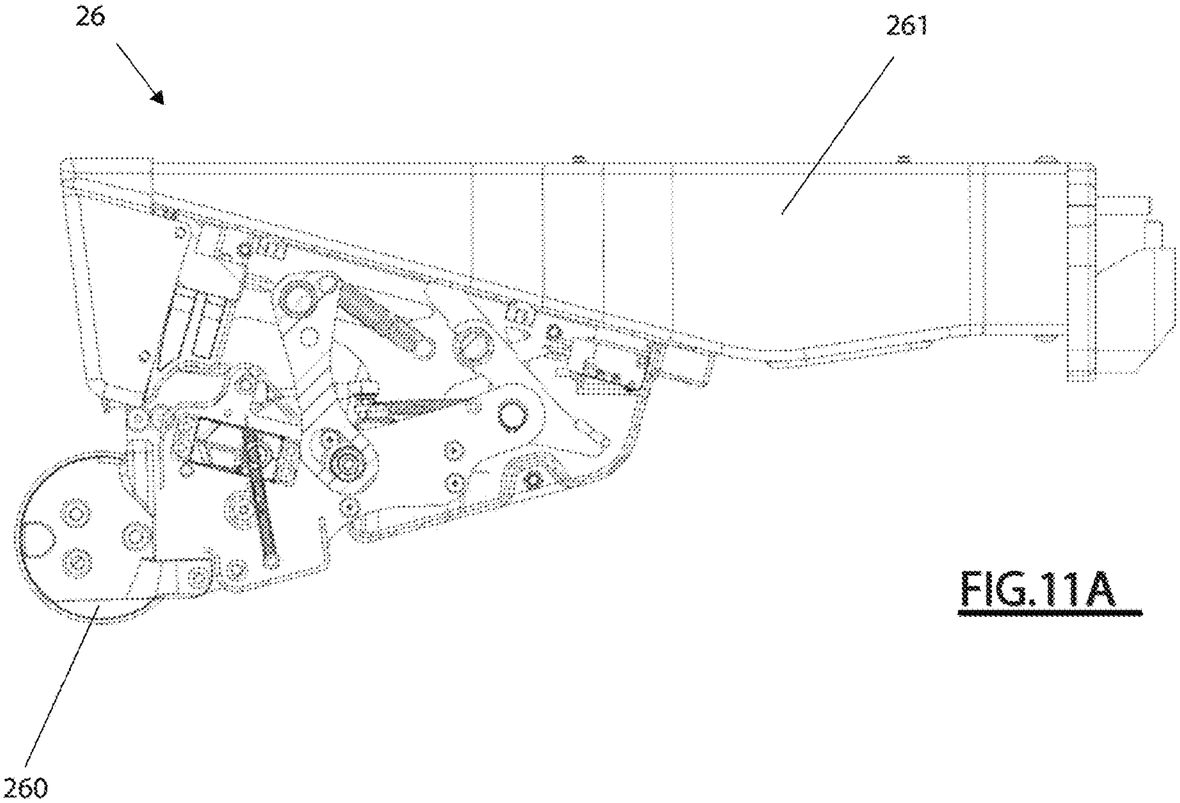
FIGS. 11A-11D are sectional views of the coupling body in FIG. 9 in the respective operating configurations.
Figure 11B:
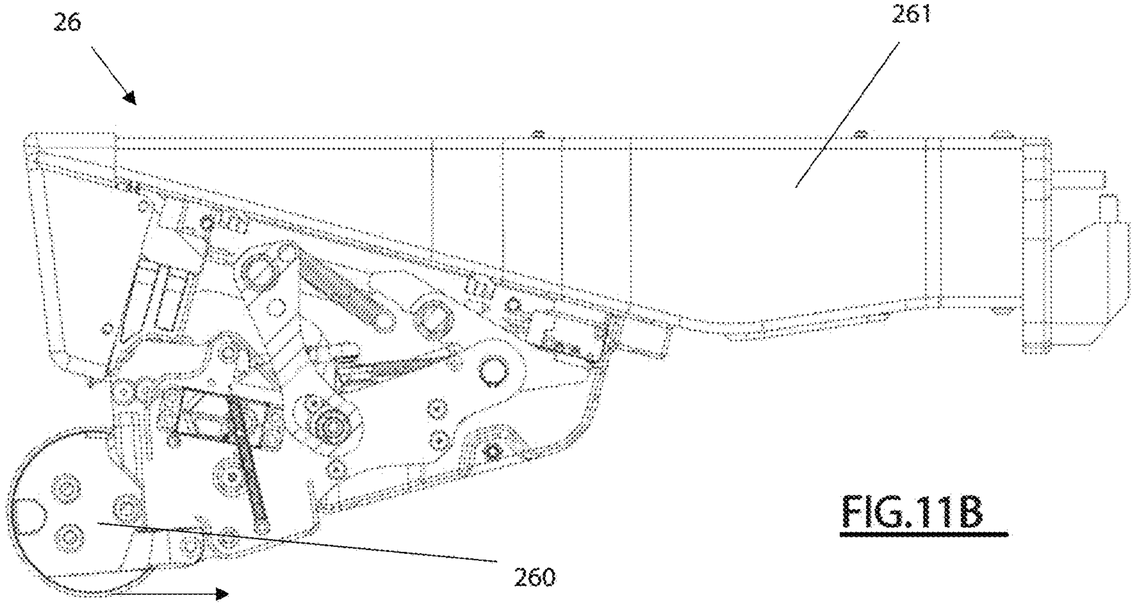
Figure 11C:
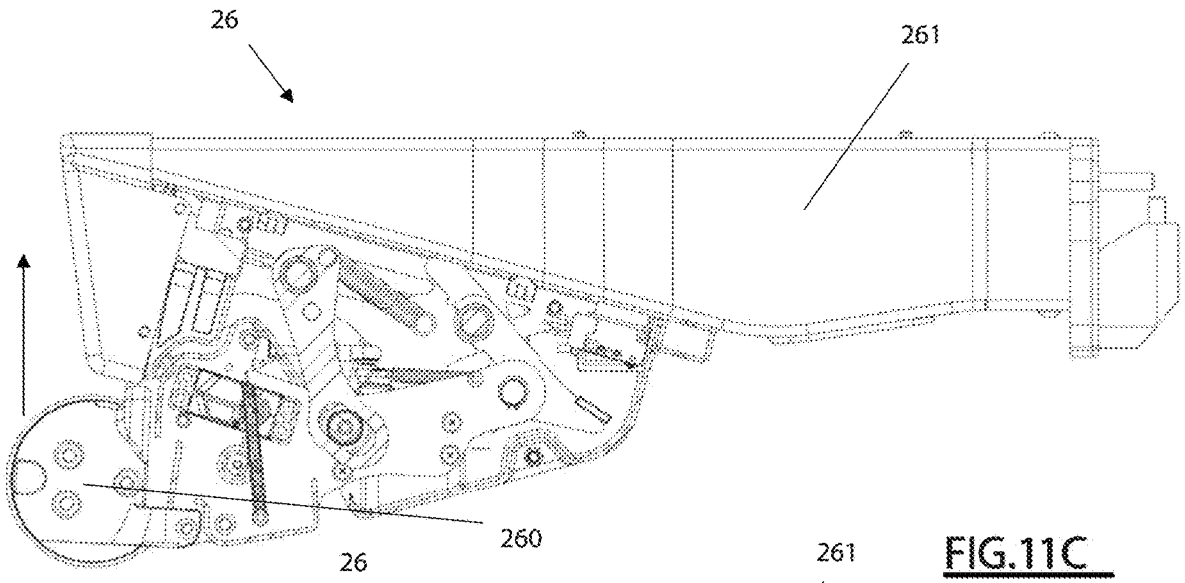
Figure 11D:
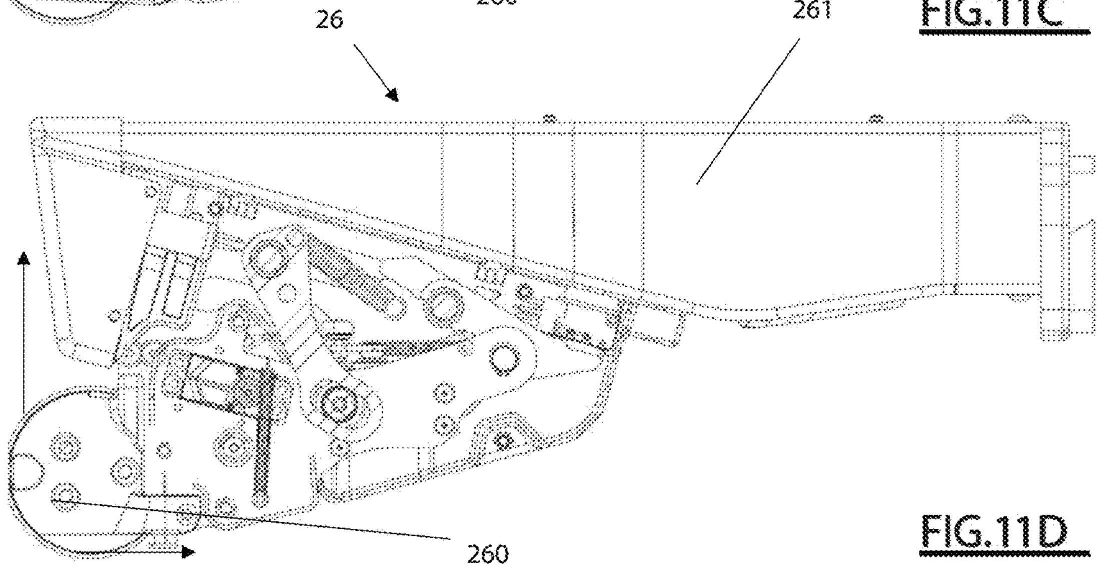
Figure 12:
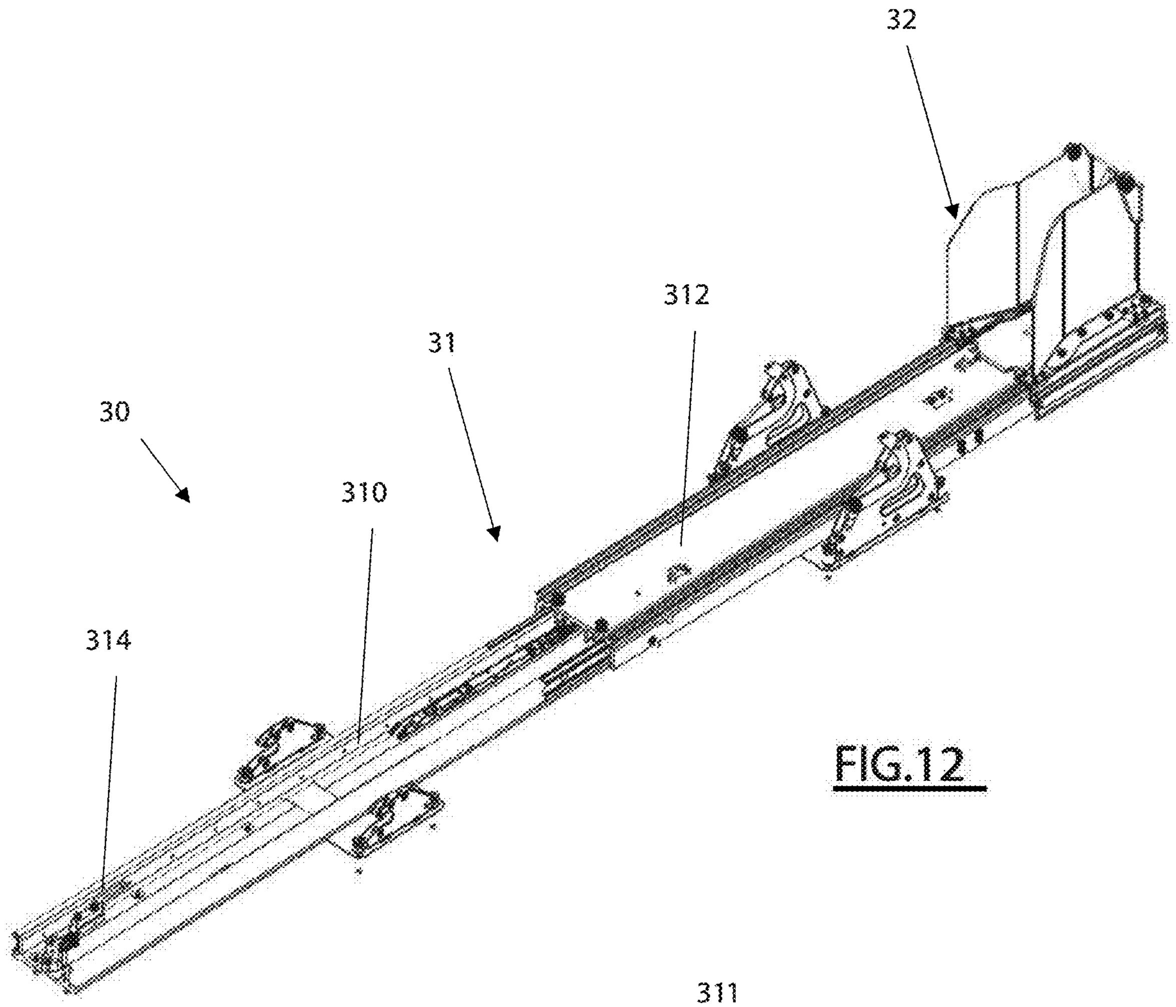
FIG. 12 is an axonometric view of a loading/unloading apparatus according to the invention.
Figure 13A:
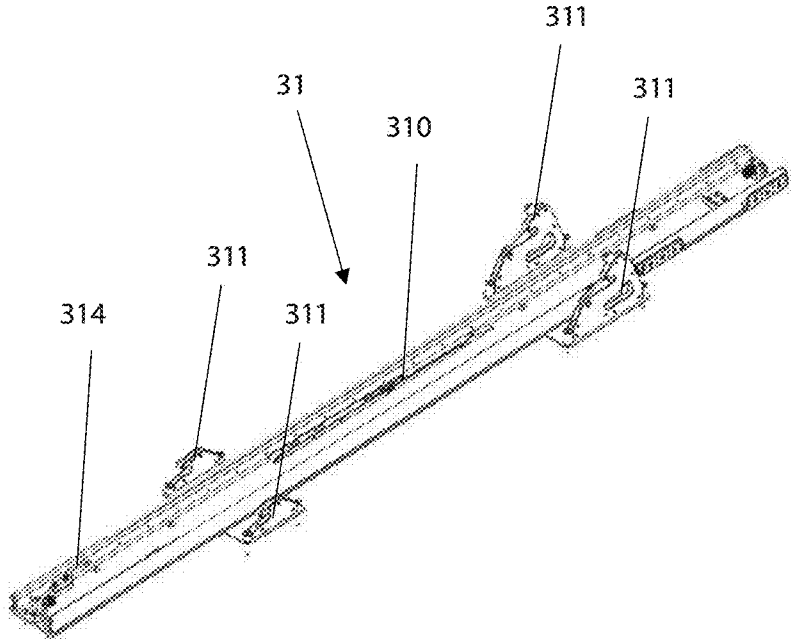
FIGS. 13A-13D are views of details of the loading/unloading apparatus of FIG. 12.
Figure 13B:
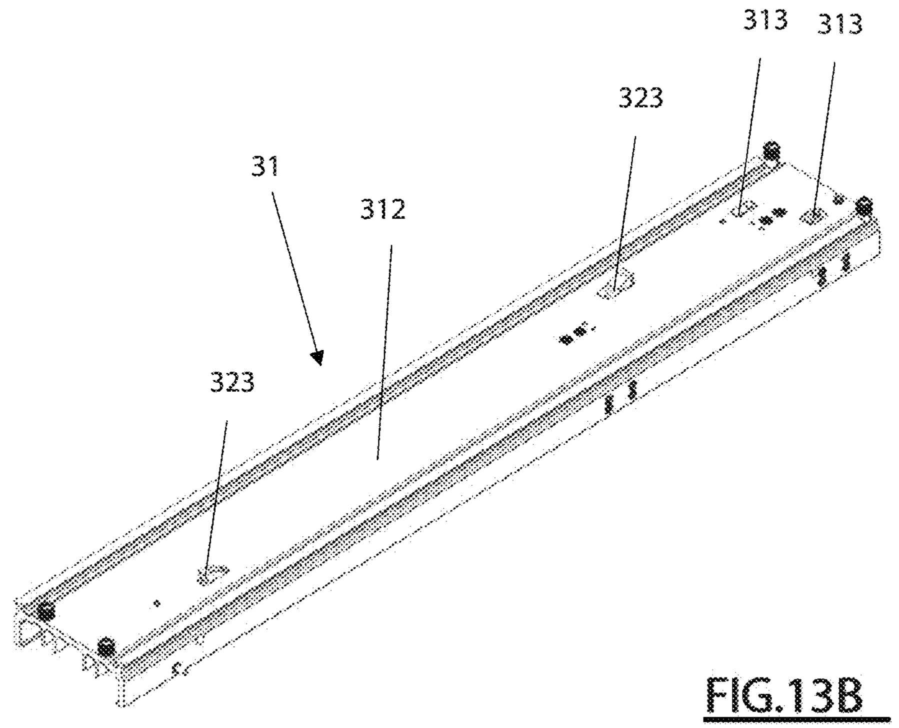
Figure 13C:
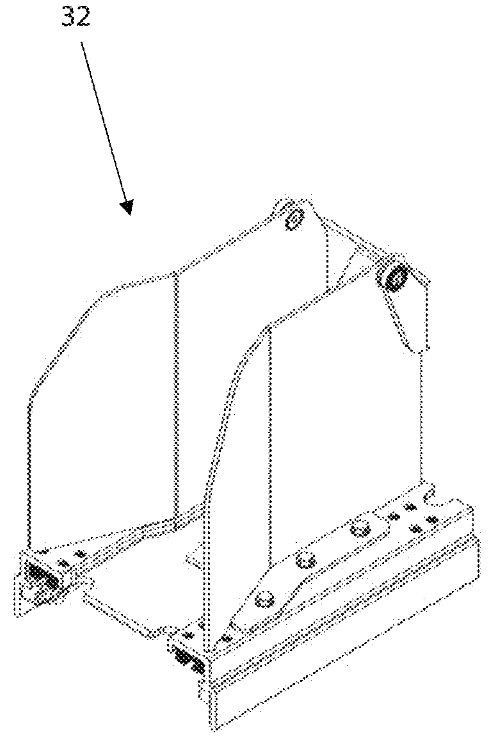
Figure 13D:
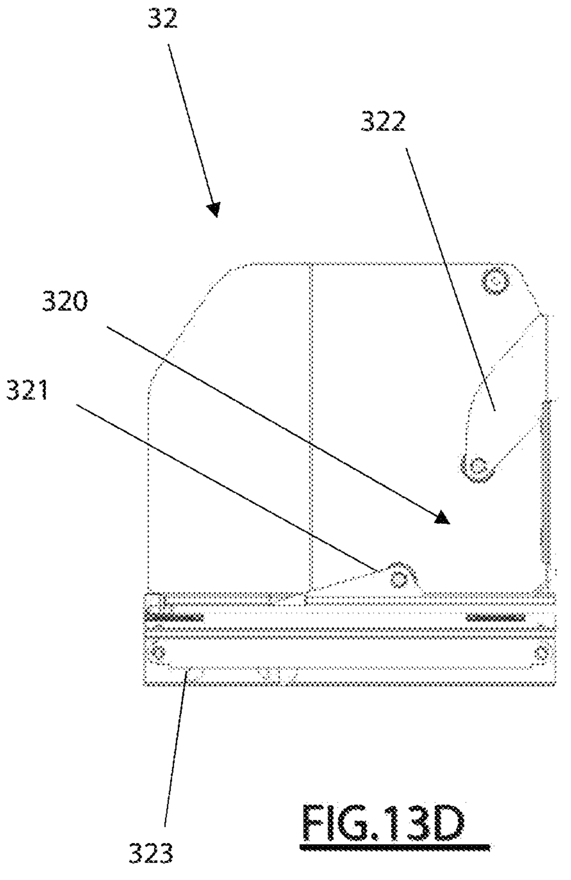
Figure 14A:
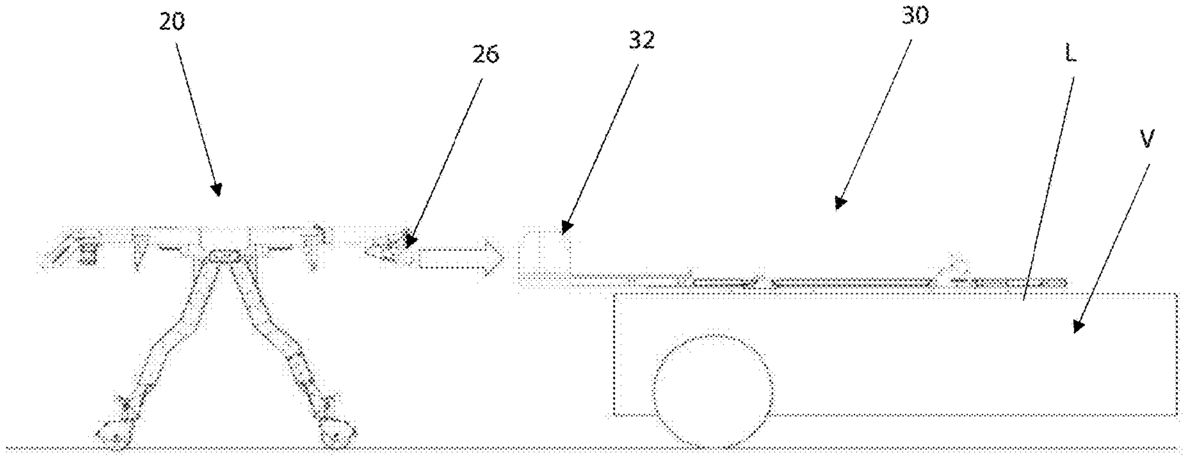
FIGS. 14A-14F are schematic views of a sequence of loading a stretcher onto the loading/unloading apparatus.
Figure 14B:
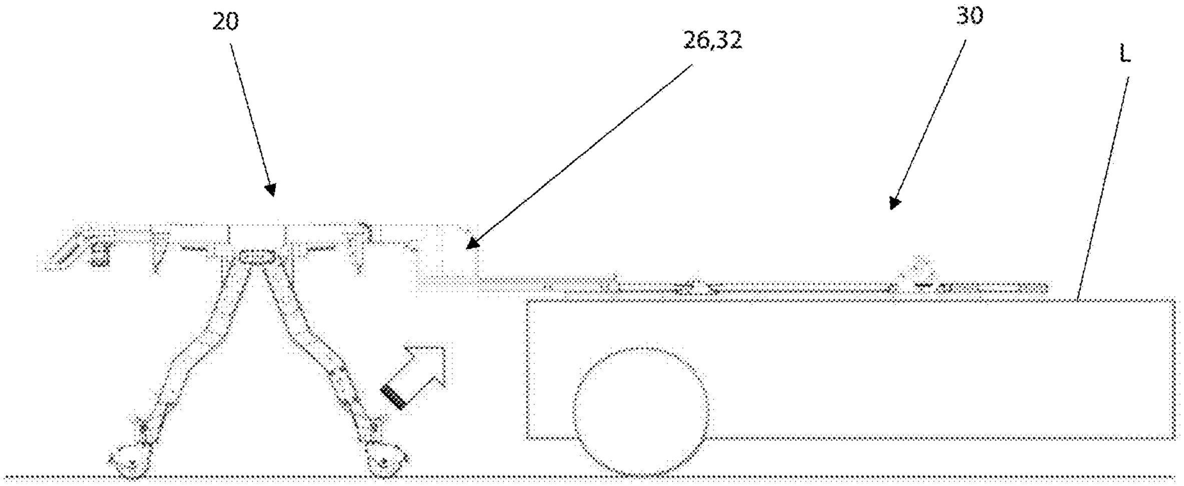
Figure 15A:
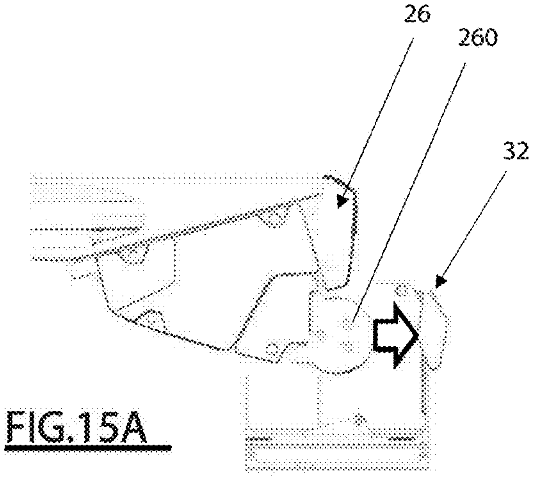
FIGS. 15A-15D are schematic views of detail of the coupling sequence between the coupling body and the support coupling during the loading sequence.
Figure 15B:
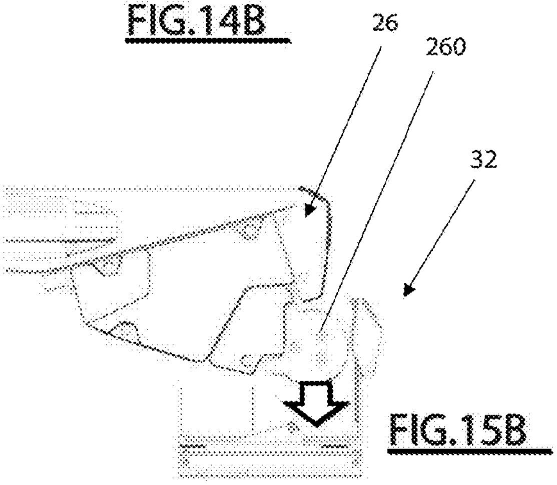
Figure 15C:
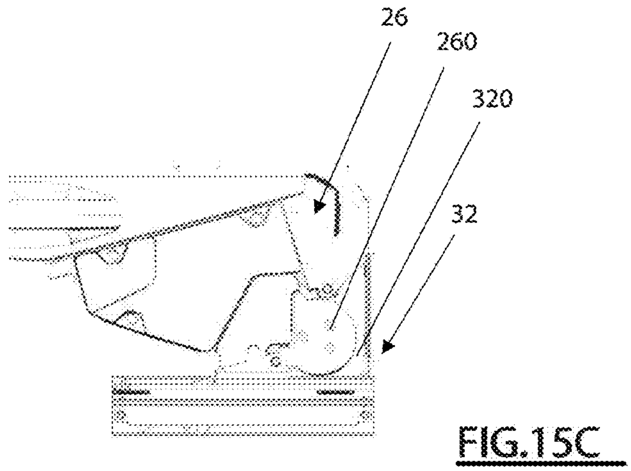
Figure 14C:
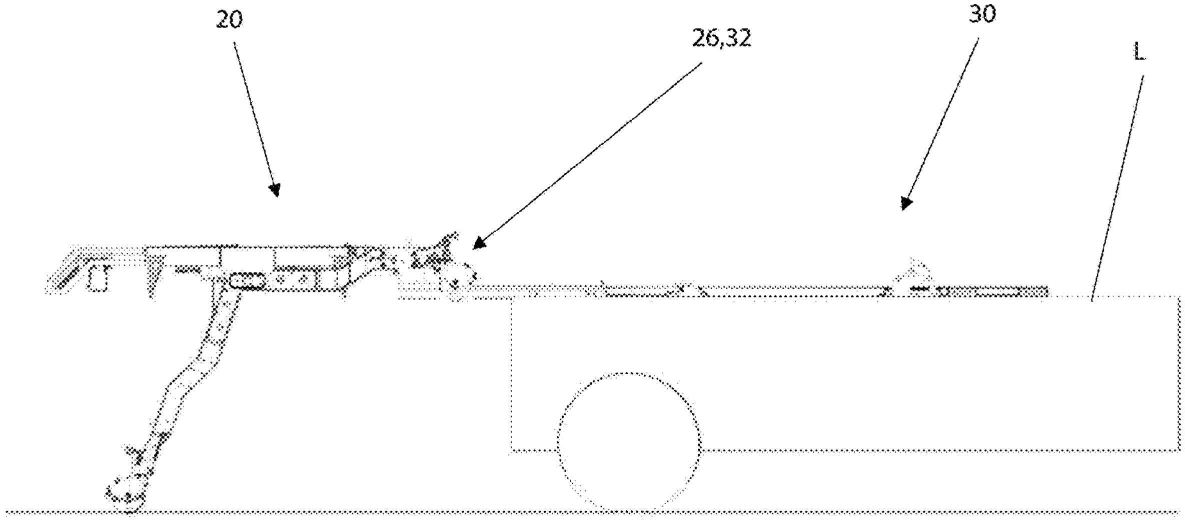
Figure 15D:
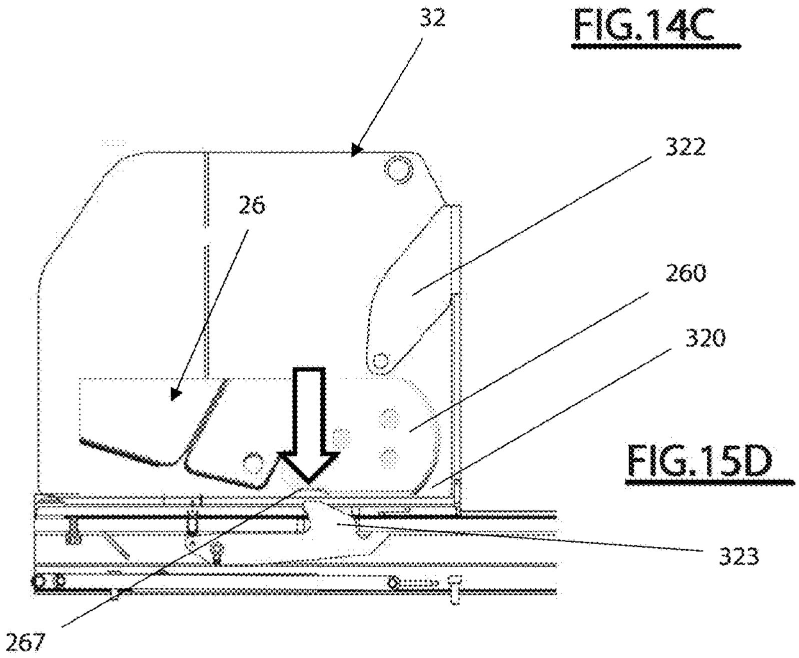
Figure 14D:
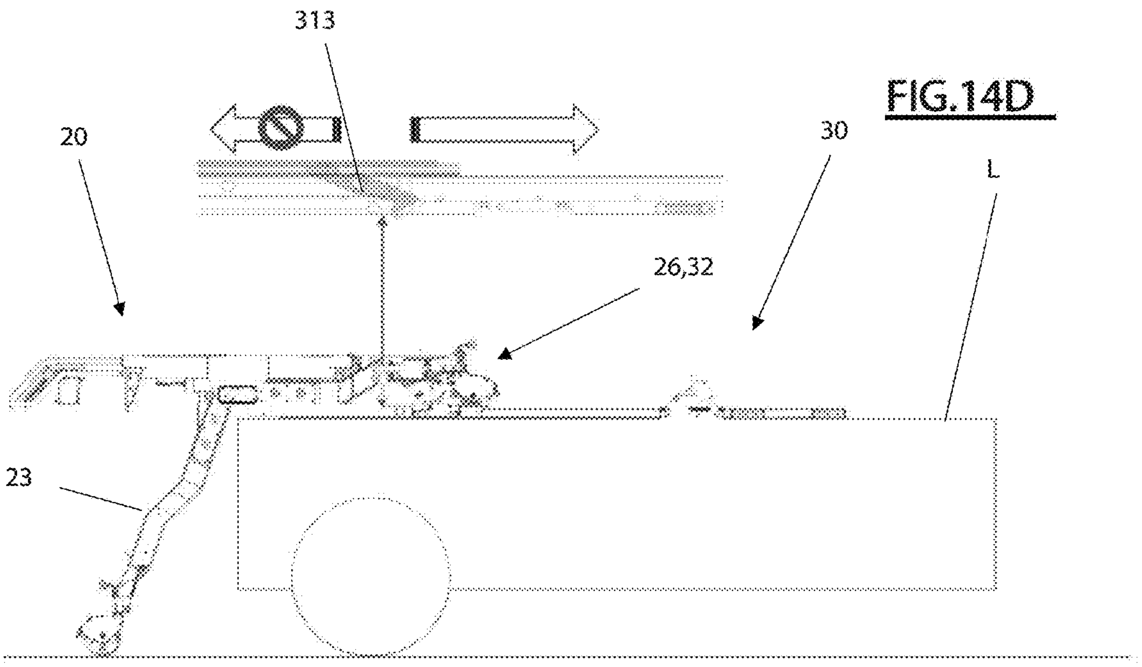
Figure 14E:
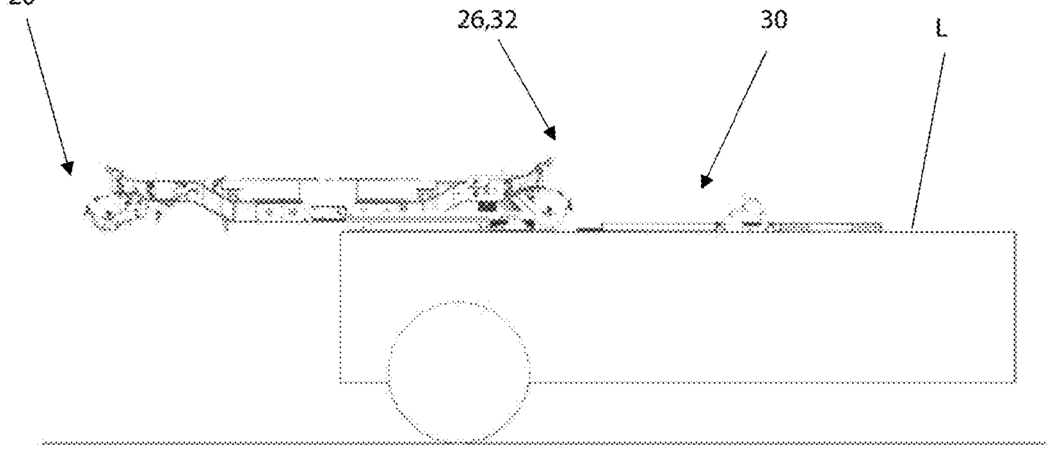
Figure 14F:
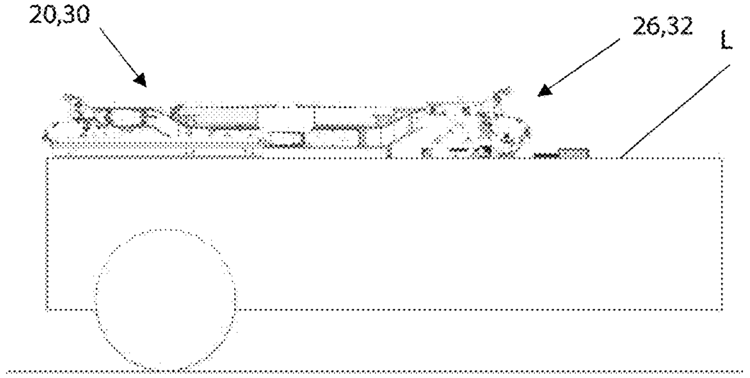
Figure 16A:
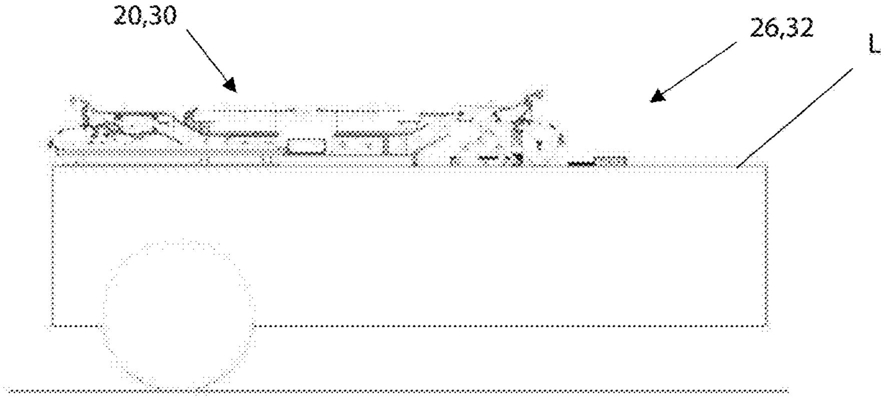
FIGS. 16A-16F are schematic views of a sequence of unloading a stretcher on the loading/unloading apparatus.
Figure 16B:
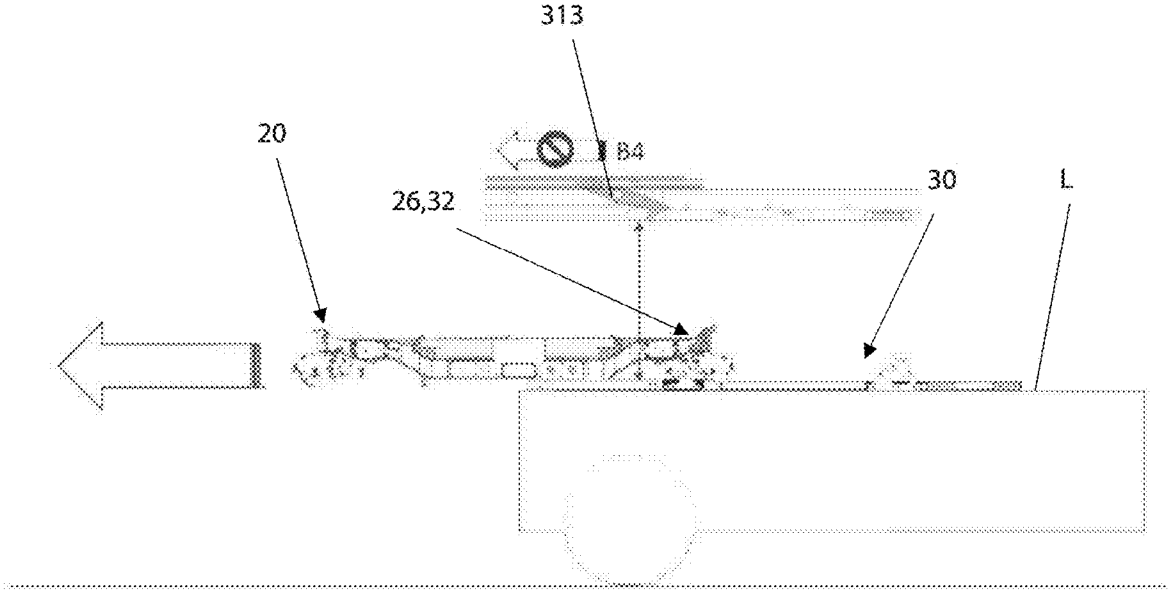
Figure 16C:
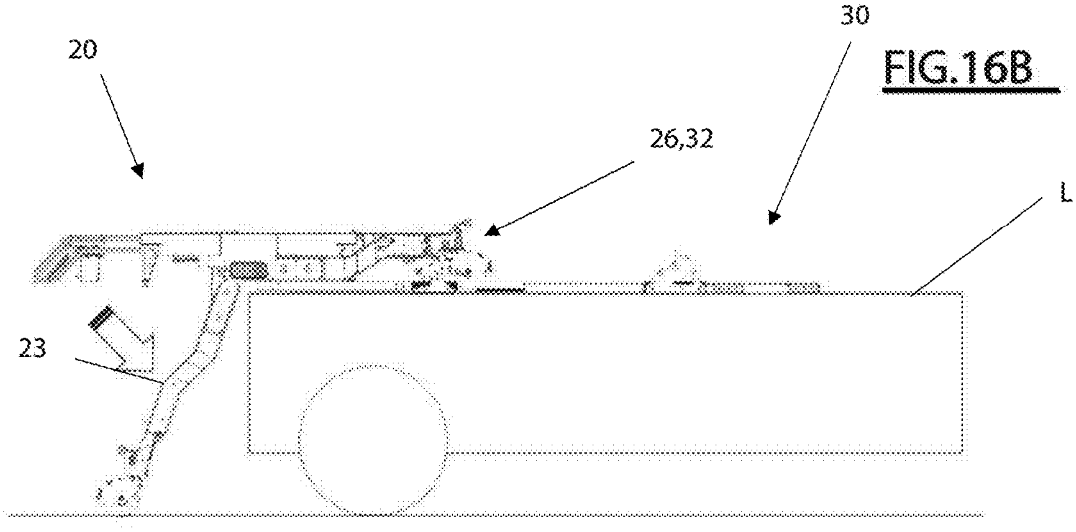
Figure 17A:
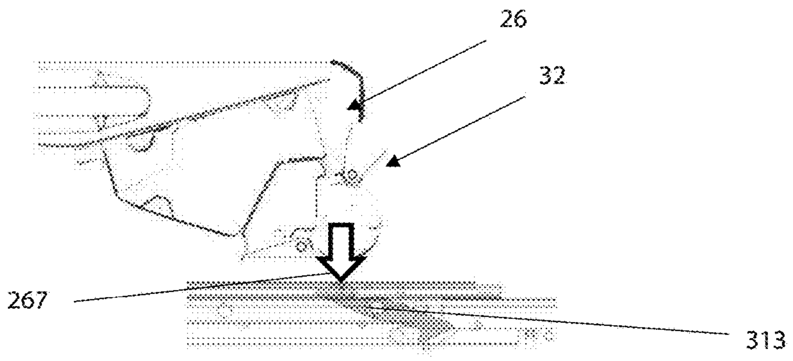
FIGS. 17A-17C are schematic views of detail of the release sequence between the coupling body and the support coupling during the unloading sequence.
Figure 16D:
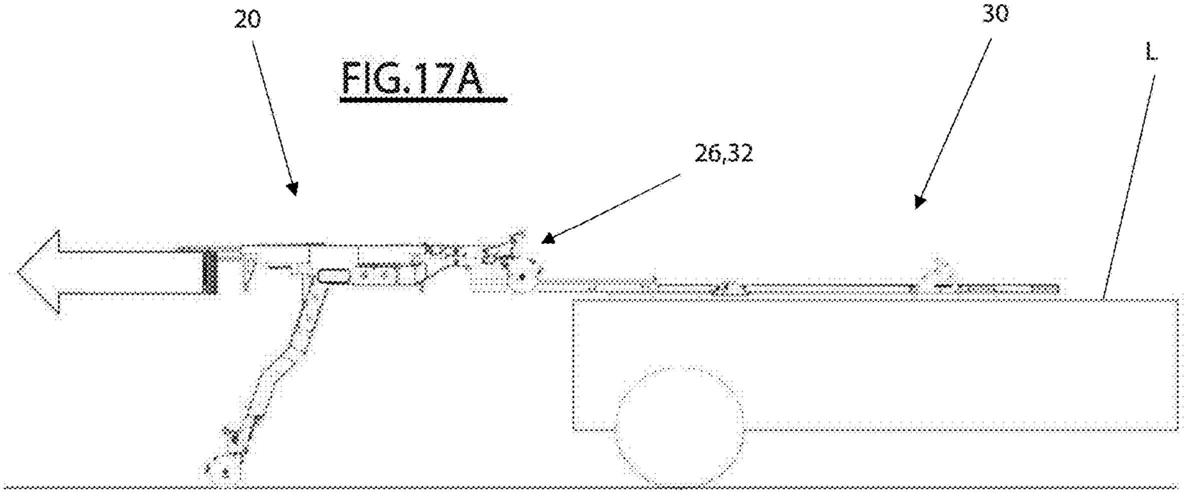
Figure 16E:
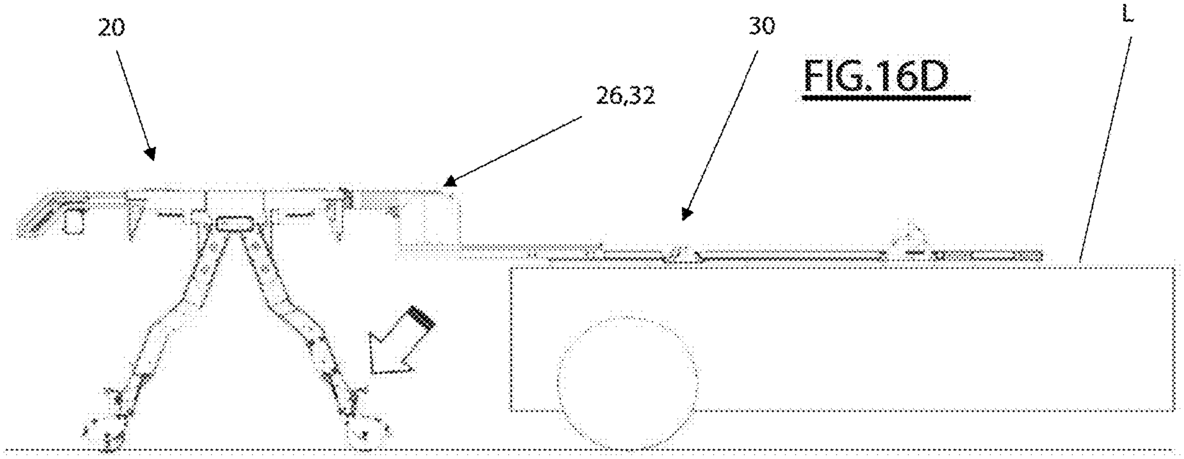
Figure 17B:
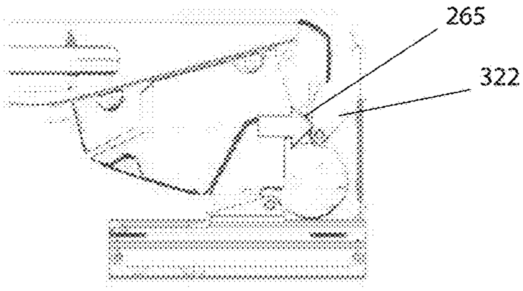
Figure 17C:
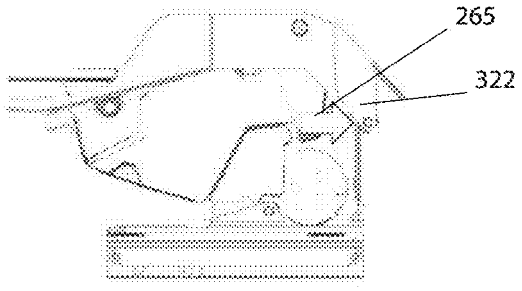
Figure 16F:
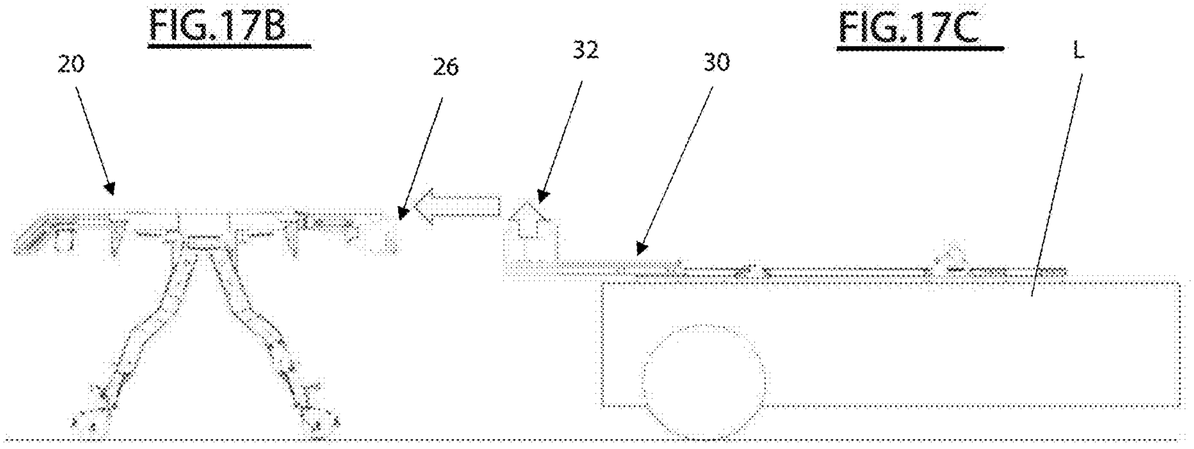

With particular reference to these figures, a system for loading/unloading a stretcher, indicated globally by number 20, onto/from a loading surface L of an ambulance V, or other patient transport and emergency vehicle, has been indicated globally by 10.

The loading area L of ambulance V is, for example, defined by the back wall of a rear loading compartment of the ambulance V, which is accessible at the rear through a rear opening of ambulance V and which extends anteriorly in a longitudinal direction along the longitudinal axis of the ambulance V towards a driver's cab thereof.

The stretcher 20 is a semi-automatically driven or power-assisted stretcher (or gurney) for transporting a patient on it and being loaded onto and/or unloaded from the loading compartment of the ambulance, either directly or indirectly resting on loading surface L.

The stretcher 20 comprises a support frame 21 comprising a front end and a rear end, an upper platform and a lower surface (in use facing the ground).

The front end is to be understood herein as the "loading end", i.e., the axial end of the support frame 21 of the stretcher 20 that is first loaded onto the loading surface L. The rear end is, on the other hand, the axial end of the support frame 21 of the stretcher 20 that is last loaded onto the loading surface L, and is to be understood as the "control end" which is the end that provides the grip and/or the commands for the operator to control the handling of the stretcher 20. In addition, the stretcher 20 is loaded with a patient, the patient's head can be oriented proximal to the front end and the patient's feet can be oriented proximal to the rear end. Therefore, the term "head" can be used interchangeably with the term "front" and the term "foot" can be used interchangeably with the term "rear". In general, the term "patient" means any living or formerly living load such as, for example, a human being, animal or other that can be transported and/or loaded onto the stretcher 20 for loading/unloading onto/from the loading surface L.

The front end and/or the rear end of the support frame 21 may be axially extendable or be fixed.

The upper platform of the support frame is configured to define a rest surface (directly or indirectly) for the patient.

Preferably, the upper platform may comprise coupling means to which a transport stretcher/bed (not shown) which supports the patient usually in a lying or semi-lying position can be fixed in a releasable way.

Furthermore, at least one coupling portion 210 (or safety hook), the function of which will be explained in more detail below, protrudes from the lower surface of the support frame 21.

In detail, at least one pair of front coupling portions 210 (mutually symmetrical with respect to a longitudinal median plane orthogonal to the upper platform of the support frame 21) and at least one pair of rear coupling portions 210, axially separated from the pair of front coupling portions 210 (and mutually symmetrical with respect to a longitudinal median plane orthogonal to the upper platform of the support frame 21) protrude from the lower surface of the support frame 21.

Furthermore, the support frame 21 comprises at least one handle bar 211, for example arranged at or near the rear end of the support frame 21.

The handle bar 211 is configured to be grasped by one or two hands of an operator to operate the pushing or pulling of the stretcher 20 and to operate a transport thereof and/or to guide it.

The stretcher 20 then comprises a pair of front legs 22 and a pair of rear legs 23 coupled inferiorly to the support frame 21 and through which the support frame 21 is supported resting on a rest plane of the stretcher 20 (defined by the ground and/or the loading surface L).

The pair of front legs 22, one including one on the right and one on the left, are mutually integral (for example, they are rigidly connected to each other).

Preferably, the pair of front legs 22 is articulated to the support frame so that their position can be varied with respect thereto.

In detail, the pair of front legs 22 is rotatably coupled to the support frame 21 (for example at a constrained end of each front leg 22) around a (single) first rotation axis R1, with the possibility of rotating between two opposing angular end stroke positions, including

- a raised angular end stroke position, in which the pair of front legs 22 (i.e. the free ends of the front legs 22 of the pair of front legs 22) is proximal to the support frame (i.e. a front angle between the pair of front legs 22 and the support frame 21, i.e. its loading platform, is minimum), and
- a lowered angular end stroke position, in which the pair of front legs 22 (i.e. the free ends of the front legs 22 of the pair of front legs 22) is distal from the support frame 21 (i.e. a front angle between the pair of front legs 22 and the support frame 21, i.e. its loading platform, is maximum).

This front angle is, however, less than 90°, e.g. comprised between 0° and 70°.

Each front leg 22 supports, at its free end, a respective front wheel holder frame 220.

The front wheel holder frame 220 is, for example, hinged to (the free end of) the respective front leg 22 around a first oscillation axis O1 parallel to the first rotation axis R1.

Each front wheel holder frame 220, in turn, supports a respective front wheel 221 for resting and rolling on the aforesaid rest plane.

Each front wheel 221 is preferably pivoting, i.e. capable of pivoting (in a free or controlled and/or lockable manner) around a respective first pivot axis P1 orthogonal to the first oscillation axis O1.

In detail, each front wheel 221 is pivotally connected (for free rotations), around a revolution axis, to a support element 222, for example fork-like, which is in turn rotatably connected (in order to perform 360° rotations), around the first pivot axis P1, to the front wheel holder frame 220.

The pair of front legs 22 and the pair of rear legs 23 are independent of each other, i.e. they are movable independently with respect to the support frame 21.

The pair of rear legs 23, one of which on the right and one on the left, are mutually integral (for example, they are rigidly connected to each other).

Preferably, the pair of rear legs 23 is articulated to the support frame so that their position can be varied with respect thereto.

In detail, the pair of rear legs 23 is rotatably coupled to the support frame 21 (e.g. at a constrained end of each rear leg 23) around a (single) second rotation axis R2 (proximal to the first rotation axis R1, e.g. parallel to and separate from it or at most also coinciding), with the possibility of rotating between two opposing angular end stroke positions, including

- a raised angular end stroke position, in which the pair of rear legs 23 (i.e. the free ends of the rear legs 23 of the pair of rear legs 23) is proximal to the support frame (i.e. a rear angle between the pair of rear legs 23 and the support frame 21, i.e. its loading platform, is minimal), and a lowered angular end stroke position, in which the pair of rear legs 23 (i.e. the free ends of the rear legs 23 of the pair of rear legs 23) is distal from the support frame 21 (i.e. a rear angle between the pair of rear legs 23 and the support frame 21, i.e. its loading platform, is maximum).

This rear angle is, however, less than 90°, e.g. comprised between 0° and 70°.

Each rear leg 23 supports, at its free end, a respective rear wheel holder frame 230.

The rear wheel holder frame 230 is, for example, hinged to (the free end of) the respective rear leg 230 around a second oscillation axis O2 parallel to the second rotation axis R2.

Each rear wheel holder frame 230, in turn, supports a respective rear wheel 231 for resting and rolling on the aforesaid rest plane.

Each rear wheel 231 is preferably pivoting, i.e. capable of pivoting (in a free or controlled and/or lockable manner) around a respective second pivot axis P2 orthogonal to the second oscillation axis O2.

In detail, each rear wheel 231 is pivotally connected (for free rotations), around a revolution axis, to a support element 232, for example fork-like, which is in turn rotatably connected (in order to perform 360° rotations), around the second pivot axis P2, to the rear wheel holder frame 230.

The pair of front legs 22 and the pair of rear legs 23 are mutually opposed.

In particular, the front angles and the rear angles are opposed.

In other words, the free ends of the front legs 22 of the pair of front legs 22 and the free ends of the rear legs 23 of the pair of rear legs 23 are proximal to each other when the pair of front legs 22 and the pair of rear legs 23 are in the lowered angular end stroke position and the free ends of the front legs 22 of the pair of front legs 22 and the free ends of the rear legs 23 of the pair of rear legs 23 are distal to each other when the pair of front legs 22 and the pair of legs rear 23 are in the raised angular end stroke position.

For example, the free ends of the front legs 22 of the pair of front legs 22 and the free ends of the rear legs 23 of the pair of rear legs 23 are arranged proximal and/or at, respectively, the front end and the rear end of the support frame 21, when the pair of front legs 22 and the pair of rear legs 23 are in the raised angular end stroke position.

The first rotation axis R1 and the second rotation axis R2 are close to each other (coinciding at most) and proximal to a median plane orthogonal to the (loading platform of the) support frame 21 parallel to them.

Still, the support frame 21 and/or the pair of front legs 22 and/or the pair of rear legs 23 may also provide one or more auxiliary rest wheels projecting below from the lower surface of the support frame and having a rotation axis parallel to the first rotation axis R1 and to the second rotation axis R2 and a rest directrix arranged at the same height as the rest directrix of the front wheels 221 and of the rear wheels 231, when they are in the raised angular end stroke position.

The stretcher 20 comprises an actuation arrangement configured to independently actuate the handling of the pair of front legs 22 and of the pair of rear legs 23, for example between the respective raised end stroke position and the respective lowered end stroke position.

The actuation arrangement comprises a first front actuator 241, which moves the pair of front legs 22 and which interconnects the support frame 21 and the pair of front legs 22.

The first front actuator 241 is, for example, a linear actuator, e.g. of the hydraulic type driven by an electric motor.

The first front actuator 241 has, for example, a cylinder, one end of which is hinged to the support frame 21, e.g. to an ear resulting from or arranged at the lower surface thereof, and a stem, one end of which is hinged to the pair of front legs 22, e.g. to a crossbar joining them.

The hinge axes of the stem and of the cylinder are parallel (and eccentric) to the first rotation axis R1.

The actuation arrangement further comprises a first rear actuator 242, which moves the pair of rear legs 23 and which interconnects the support frame 21 and the pair of rear legs 23.

The first rear actuator 242 is, for example, a linear actuator, e.g. of the hydraulic type driven by an electric motor.

The first rear actuator 242 has, for example, a cylinder, one end of which is hinged to the support frame 21, e.g. to an ear resulting from or arranged at the lower surface thereof, and a stem, one end of which is hinged to the pair of rear legs 23, e.g. to a crossbar joining them.

The hinge axes of the stem and cylinder are parallel (and eccentric) to the second rotation axis R2.

The stretcher 20 also comprises a handling arrangement configured to independently actuate the handling of each of the front wheel holder frame 220 around the first oscillation axis O1 and of each rear wheel holder frame 230 around the second oscillation axis O2 (to vary the inclination with respect to the respective leg).

The handling arrangement comprises, for each front leg 22 of the pair of front legs 22 a respective second front actuator 251.

Each second front actuator 251 moves a respective front wheel holder frame 220 and interconnects the respective front leg 22 of the pair of front legs 22 and the respective front wheel holder frame 220.

Each second front actuator 251 is for example a linear actuator, for example of the electric type provided with an electrically controlled brake.

Each second front actuator 251 has, for example, a cylinder, one end of which is fixed or hinged to the respective front leg 22 (e.g., internally therein), and a stem, one end of which is hinged to the respective front wheel holder frame 220, for example, at a connection ear thereof.

The hinge axis of the stem is parallel (and eccentric) to the first oscillation axis O2.

In addition, the handling arrangement comprises, for each rear leg 23 of the pair of rear legs 23, a respective second rear actuator 252.

Each second rear actuator 252 moves a respective rear wheel holder frame 230 and interconnects the respective rear leg 23 of the pair of rear legs 23 and the respective rear wheel holder frame 230.

Each second rear actuator 252 is for example a linear actuator, for example of the electric type provided with an electrically controlled brake.

Each second rear actuator 252 has, for example, a cylinder, one end of which is fixed or hinged to the respective rear leg 23 (e.g., internally therein), and a stem, one end of which is hinged to the respective rear wheel holder frame 230, for example, at a connection ear thereof.

The hinge axis of the stem is parallel (and eccentric) to the second oscillation axis O2.

The stretcher 20 comprises a front coupling body 26 connected to the front end of the support frame 21, e.g., facing the front and/or the bottom thereof.

The coupling body 26 comprises a coupling head 260 (facing frontally and/or inferiorly the support frame 21), which is for example supported by a small support frame 261 rigidly fixed to the support frame 21.

The small support frame 261 is of the box type with the coupling head 260 protruding from the front free end.

Preferably, the coupling head 260 is defined/constituted by a spherical or hemispherical (or at most truncated conical/pyramidal) body.

The coupling body 26, in particular the coupling head 260, is arranged on the longitudinal median plane orthogonal to the rest platform (i.e. vertical) of the support frame 21.

Preferably, the coupling head 260 is centred on said longitudinal median plane, i.e. it has a centre that belongs to said longitudinal median plane.

Advantageously, the coupling head 260 is associated with the small support frame 261 and, therefore, with the support frame 21 in a movable manner (free to move, not actuated).

In particular, the coupling head 260 is associated with the small support frame 261 and, therefore, with the support frame 21 with the possibility of movement with respect to at least a first degree of translational (and/or roto-translational) freedom substantially parallel to the (rest platform of the) support frame 21 and, preferably, directed along the longitudinal axis of the support frame 21, between two horizontal (mechanical) end stroke positions, including a front end stroke, wherein the coupling head 260 is distal from the support frame 21, and a rear end stroke, wherein the coupling head 260 is proximal to the support frame 21.

Furthermore, the coupling head 260 is associated with the small support frame 261 and, therefore, with the support frame 21 with the possibility of movement with respect to at least a second degree of translational (and/or roto-translational) freedom substantially orthogonal to the (rest platform of the) support frame 21, between two vertical (mechanical) end stroke positions, including a lower end stroke, wherein the coupling head 260 is distal from the support frame 21, and an upper end stroke, wherein the coupling head 260 is proximal to the support frame 21.

In particular, the coupling head 260 is connected to the small support frame 261 by means of an articulation, which is for example defined by an articulated kinematic mechanism 262 (such as an articulated quadrilateral), which allows the translation of the coupling head 260 with respect to the aforesaid first degree of translational freedom and to the second degree of translational freedom.

The articulated kinematic mechanism 262 is defined by a plurality of levers hinged to each other (and interconnected with the small support frame 261 defining one of said levers) by means of respective articulation axes, wherein the articulation axes of the articulated kinematic mechanism are all parallel to each other and parallel to the first rotation axis R1 and to the second rotation axis R2.

Advantageously, the coupling head 260 is movable from the front end stroke to the rear end stroke in contrast to first elastic means, for example defined by a first spring 263, for example helical.

In practice, the first spring 263 is configured so as to define the front end stroke position as a stable equilibrium position for the coupling head 260 (and the rear end stroke position as an unstable equilibrium position for the coupling head 260).

The first spring 263 is connected to the articulated kinematic mechanism, e.g. interconnected between two levers thereof.

In addition, the coupling head 260 is movable from the lower end stroke to the upper end stroke in contrast to second elastic means, e.g. defined by a second spring, e.g. helical.

In practice, the second spring is configured so as to define the lower end stroke position as a stable equilibrium position for the coupling head 260 (and the upper end stroke position as an unstable equilibrium position for the coupling head 260).

The second spring is connected to the articulated kinematic mechanism, e.g. interconnected between two levers thereof.

Preferably, the second spring coincides with the first spring 263.

The stretcher 20, i.e., the coupling body 26, further comprises a release arrangement arranged at the front end of the support frame 21, i.e., the small support frame 261, and configured to operate a release of the coupling body 26, as further described below.

The release arrangement comprises, for example, a first pin 265, slidingly associated with the small support frame 261 and, therefore, with the support frame 21 along a sliding direction parallel to the (rest platform of the) support frame 21 and directed along the longitudinal axis of the support frame 21, between two horizontal end stroke positions, including an extracted position, wherein the first pin 265 protrudes at least partially externally to the small support frame 261, preferably beyond at least an axial portion of the coupling head 260 (at least when this is in the rear end stroke position), and distal from the support frame 21, and a retracted position, wherein, for example, the first pin 265 retracts internally to the small support frame 261 (receding with respect to the coupling head 260).

For example, the first pin 265 is actuated between its extracted position and its retracted position by a first actuator means, defined for example by a first servomotor 266 fixed to the small support frame 261, for example internally thereto.

The release arrangement comprises, for example, a second pin 267, slidingly associated with the small support frame 261 and, therefore, with the support frame 21 along a sliding direction orthogonal to the (rest platform of the) support frame 21, between two vertical end stroke positions, including an extracted position, wherein the second pin 267 at least partially protrudes externally to the small support frame 261 (inferiorly thereto), preferably beyond at least a radial portion of the coupling head 260 (at least when this is in the upper end stroke position), and distal from the support frame 21, and a retracted position, wherein for example the second pin 267 retracts internally to the small support frame 261 (receding with respect to the coupling head 260).

For example, the second pin 267 is actuated between its extracted position and its retracted position by a second actuator means, defined for example by a second servomotor 268 fixed to the small support frame 261, for example internally thereto.

The stretcher 20 comprises a sensor arrangement (stretcher sensors).

The sensor arrangement, for example, comprises at least one first front angle sensor S1 associated with the pair of front legs 22 (and/or with the first front actuator 241), wherein the first front angle sensor is configured to detect an angular position of the pair of front legs 22 with respect to the support frame 21.

The sensor arrangement, for example, comprises at least one first rear angle sensor S2 associated with the pair of rear legs 23 (and/or with the first rear actuator 242), wherein the first rear angle sensor S2 is configured to detect an angular position of the pair of rear legs 23 with respect to the support frame 21.

The sensor arrangement, for example, may comprise at least one second front angle sensor S3 associated with at least one front wheel holder frame 220, for example one for each front wheel holder frame 220, wherein each second front angle sensor S3, is configured to detect an angular position of the respective front wheel holder frame 220 with respect to the respective front leg 22.

The sensor arrangement, for example, may comprise at least one second rear angle sensor S4 associated with at least one rear wheel holder frame 230, for example one for each rear wheel holder frame 230, wherein the second rear angle sensor S4 is configured to detect an angular position of the respective rear wheel holder frame 230 with respect to the respective rear leg 23.

The sensor arrangement, for example, comprises at least one front absolute linear potentiometer S5 associated with at least one front wheel holder frame 220, for example one for each front wheel holder frame 220, wherein each front absolute linear potentiometer S5 is configured to detect an absolute angular position of the respective front wheel holder frame 220.

The sensor arrangement, for example, comprises at least one rear absolute linear potentiometer S6 associated with at least one rear wheel holder frame 230, for example one for each rear wheel holder frame 230, wherein each rear absolute linear potentiometer S6 is configured to detect an absolute angular position of the respective rear wheel holder frame 230.

The sensor arrangement, for example, comprises a first distance sensor S7 (e.g. of the laser, on/off type) fixed to the support frame 21, e.g. to the lower surface thereof (preferably at the transverse median plane orthogonal to the longitudinal axis of the support frame), facing downwards, wherein the first distance sensor S7 is configured to detect a distance between the support frame 21 (i.e. its lowest lower surface) and the underlying rest plane.

The sensor arrangement, for example, comprises a second distance sensor S8 (e.g. of the laser, on/off type) fixed to the support frame, e.g., near the front end thereof, preferably at the small support frame 261, e.g. at the lower surface thereof, facing downwards, wherein the second distance sensor S8 is configured to detect a distance between the support frame 21, i.e. the small support frame 261 (i.e. its lowest lower surface) and an underlying abutment surface.

The sensor arrangement, for example, comprises a first proximity sensor S9 (e.g. of the magnetic type) fixed to the support frame, for example, near the front end thereof, preferably at the front-facing small support frame 261, wherein the first proximity sensor S9 is configured to detect a proximity between the support frame 21, i.e. the small support frame 261, and a front abutment surface.

The sensor arrangement, for example, comprises a first limit switch sensor S10, for example fixed to the small support frame 261, which is configured to detect when the coupling body 26, i.e. the coupling head 260, is in its rear end stroke position.

For example, the first limit switch sensor S10 is of the type of a contact (mechanical) switch (of the on/off type).

The sensor arrangement, for example, comprises a second limit switch sensor S11, for example fixed to the small support frame 261, which is configured to detect when the coupling body 26, i.e. the coupling head 260, is in its upper end stroke position.

For example, the second limit switch sensor S11 is of the type of a contact (mechanical) switch (of the on/off type).

The sensor arrangement, for example, comprises a third distance sensor S12 (e.g. of laser type), arranged on the coupling body 26, for example integral with at least one between the small support frame 261 and the coupling head 260.

The sensor arrangement, for example, comprises a second proximity sensor S13 (e.g., a magnetic reed) arranged on/in proximity to at least one coupling portion 210, for example on each front coupling portion 210 or preferably only at the rear coupling portions 210.

The sensor arrangement, for example, comprises a front pressure sensor S14 associated with the (hydraulic circuit of) first front actuator 241, which is for example configured to detect a pressure value of the actuating fluid of the first front actuator 241.

The sensor arrangement, for example, comprises a rear pressure sensor S15 associated with the (hydraulic circuit of) first rear actuator 242, which is for example configured to detect a pressure value of the actuating fluid of the first rear actuator 242.

The sensor arrangement, for example, comprises an inclinometer S16 associated with the support frame 21, e.g. at/in proximity to the rear end thereof, as further described below.

The stretcher 20 further comprises a power supply system on board the stretcher. For example, the stretcher 20 comprises at least one battery (or battery pack) fixed to the support frame 21, for example in a rechargeable and/or removable and/or replaceable manner.

The supply system is configured to supply power to the actuation arrangement, and/or the handling arrangement and/or the sensor arrangement and/or the release arrangement and/or a control module (described hereinbelow).

The stretcher 20 further comprises a control module 27, which is, for example, arranged at/in proximity to the rear end of the support frame 21.

The control module 27 is, generally, configured to receive commands as input from the operator and provide indications as output to be made available to the operator and/or other command signals to be made available to the system 10 and/or to the stretcher 20.

The control module 27, for example, may comprise one or more commands 270 which can be actuated by the operator.

For example, the commands 270 can be fixed to the handle bar 211 and/or near it at the rear end of the support frame 21.

The operator can use the commands 270 in the loading and unloading of the stretcher 20 to control and/or command the movement of the pair of front legs 22 and of the pair of rear legs 23 and other.

The commands 270 may further comprise one or more lifting buttons ("+") which can be actuated to raise the stretcher 20 and one or more lowering buttons ("−") which can be actuated to lower the stretcher 20.

Each of the lifting buttons and the lowering buttons may generate signals that actuate the pair of front legs 22, the pair of rear legs 23 or both to perform functions of the stretcher 20, which provide for the pair of front legs 22, the pair of rear legs 23 or both to be lowered or raised.

In some embodiments, each of the lifting buttons and of the lowering buttons may be analogue (i.e., pressing and/or moving the button may be proportional to a parameter of the control signal).

The actuation speed of the pair of front legs 22, of the pair of rear legs 23 or both can be proportional to the control signal parameter.

The control module 27 may comprise a visual display component or graphical user interface 271 configured to make (visual, tactile, auditory or other) information available to the operator.

For example, the user interface 271 is fixed to the rear end of the support frame 21.

The user interface 271 may comprise any device capable of emitting an image such as, for example, a liquid crystal display, a touch screen or the like.

One or more lifting buttons and lowering buttons can be defined as integral to the graphical interface.

In addition, the inclinometer S16 can be defined as integrated in the graphical interface.

The stretcher 20, i.e. its control module 27, further comprises an electronic control unit 272 (of the stretcher).

The electronic control unit 272 may be any device/processor capable of executing machine-readable instructions such as, for example, a controller, an integrated circuit, a microchip or the like.

As used herein, the term "communicatively coupled" means that the components are capable of exchanging data signals with each other such as, for example, electrical signals via conductive medium, electromagnetic signals via air, optical signals via optical waveguides and the like.

The electronic control unit 272 may be provided with or connected to one or more memory modules, which may be any device capable of storing data and/or instructions and/or software programmes that can be read and implemented by the electronic control unit 272.

The electronic control unit 272 is operatively connected to the actuation arrangement, and/or the handling arrangement and/or the sensor arrangement and/or the control module 27 and/or the supply system and/or the release arrangement.

The system 10 further comprises a loading/unloading apparatus 30, which is fixed to or carried by the ambulance V.

The loading/unloading apparatus comprises a longitudinal guide 31, which is configured to be placed on the loading surface L of the ambulance V (parallel to the longitudinal axis of the ambulance).

The guide 31 comprises, for example, a fixed rail 310, which is fixed (e.g. bolted) to the loading surface L.

The fixed rail 310 has a length substantially equal to the axial length of the stretcher 20.

Further, the fixed rail 310 has a rear end arranged at or proximal to the rear opening of the ambulance V and an opposing front end arranged proximal to the driver's cab of the ambulance V.

Safety couplings 311 (so-called hooks 20*g*) rise from the fixed rail 310 and are configured to couple to the coupling portion 210 of the stretcher 20.

In detail, at least one pair of front safety couplings 311 protrude from the upper surface of the fixed rail 310, i.e. they are distal from the rear opening of the ambulance V, which are (mutually symmetrical with respect to a median longitudinal plane orthogonal to the loading plane L and) configured to couple (snap-fittingly) to the pair of front coupling portions 210 of the stretcher 20, and at least one pair of rear safety couplings 311, i.e. proximal to the rear opening of the ambulance V, which are (mutually symmetrical with respect to the median longitudinal plane orthogonal to the loading plane L and) configured to couple (snap-fittingly) to the pair of rear coupling portions 210 of the stretcher 20.

The guide 30, for example, may comprise an intermediate slide 312, which is slidingly (superiorly) associated with the fixed rail 310, along a sliding direction parallel to the longitudinal axis of the fixed rail 310.

The slide 312, for example, is essentially half long the length of the fixed rail 310.

The slide 312 has a rear end arranged proximal to the rear opening of the ambulance V and an opposing front end arranged proximal to the driver's cab of the ambulance V.

For example, the slide 312 is configured to slide (with free sliding, i.e. not actuated) along the fixed rail 310 between two end positions, including a front end position, wherein for example the front end of the slide 312 is substantially placed at the front end of the fixed rail 310, and a rear end position, wherein for example the rear end of the slide 312 projects axially with respect to the rear end of the fixed rail 310 (by a stretch substantially equal to half the length of the slide 312), preferably so as to be able to project substantially outside the loading surface L (and therefore the loading compartment) of the ambulance V.

Between the two end positions, the slide 312 travels substantially ¾ of the length of the fixed rail 310.

The guide 31 further comprises one or more coupling elements 313, interposed between the slide 312 and the fixed rail 310, configured to (temporarily) stop the slide 312 at corresponding axial stop positions along the travel between the two end positions and/or at each of said end positions.

In particular, the guide 31 has a front coupling element 313 configured to (temporarily) stop the slide 312 in the rear end position.

Further, the guide 31 has an intermediate coupling element 313 configured to (temporarily) stop the slide 312 at an intermediate stop position between the front end position and the rear end position, for example wherein the rear end of the slide 312 is placed substantially at the rear end of the fixed rail 310.

For example, the intermediate coupling element 313 defines a unidirectional constraint that does not allow the slide 312 to slide in the direction of approach to the rear end position (but it allows the slide 312 to slide in the direction of approach to the front end position).

For example, the coupling elements 313 are configured to be releasable from the release arrangement of the stretcher 20, i.e., from the second pin 267 (in the passage from the retracted position to the extracted position thereof, when the second pin 267 is at, or superimposed in plan, on a release appendage of the coupling element 313 which emerges above the slide 312, at least when it couples with the fixed rail 310) and/or from a cam system which can be actuated by a support coupling 32 (described in detail below).

The loading/unloading apparatus 30 further comprises a support coupling 32, which is slidingly (superiorly) connected to the guide 31 along a sliding direction parallel to the longitudinal axis of the guide.

The support coupling 32 is configured to receive through releasable coupling the coupling body 26, i.e., the coupling head 260, of the stretcher 20, as will be more fully described below, and/or to support at least partially the stretcher 20 (performing an anti-tip function for it).

The support coupling 32 defines a concave seat formed by a rear wall (orthogonal to the longitudinal axis of the guide 31), two lead-in side walls, having a free rear end and a rear end which is joined to the rear wall, and a lower wall (which is joined to the side walls and to the rear wall).

In practice, the support coupling 32 is defined by a box-like body open at the top and front and closed laterally by the side walls, at the rear by the rear wall and at the bottom by the lower wall.

The lead-in side walls preferably converge towards the rear wall, so that the free front ends are at a greater distance apart than the distance between the rear ends.

The concave seat contained between the lead-in side walls, the rear wall and the lower wall delimits an internal volume within which a coupling seat 320 is contained.

The coupling seat 320 is configured to define a snap-on coupling, releasable, with the coupling head 260 of the stretcher 20.

The coupling seat 320, in this case, comprises a first lower coupling 321, which is, for example, fixed with respect to the coupling seat 320.

The free upper end of the first coupling 321 is, for example, associated with a revolution member, such as a roller (rotatably associated with the first coupling 321 with respect to a rotation axis parallel to the loading surface L and orthogonal to the sliding direction).

The roller is configured to roll on the coupling head 260 during the coupling and release operations.

The coupling seat 320 further comprises a second upper coupling 322, which is movable with respect to the coupling seat 320.

The second coupling 322 is, for example, movable from a rear position to a front position, for example in contrast to an elastic thrust force, preferably exerted by a thrust spring, for example helical.

Preferably, the second coupling 322 is associated in a tilting manner with the coupling seat 320, for example with the rear wall thereof (and facing frontally therefrom), around a second (horizontal) tilting axis orthogonal to the sliding direction of the support coupling 32.

The free upper end of the second coupling 322 is, for example, associated with a revolution member, such as a roller (rotatably associated with the second coupling 322 with respect to a rotation axis parallel to the second tilting axis).

The roller is configured to roll on the coupling head 260 during the coupling and release operations.

In practice, the coupling seat 320 is defined between the first coupling 321 and the second coupling 322 (i.e., between the two rollers) and is selectively configurable between two operating positions, including:

- a first open configuration, in which the second coupling 322 is in the rear position (and the distance between the rollers is such as to allow the passage of the maximum diameter zone of the coupling head 260); and
- a second closed configuration, in which the second coupling 322 is in the front position (and the distance between the rollers is minimal and such as to prevent the passage of the maximum diameter zone of the coupling head 260).

The second coupling 322, moreover, is such as to define an anti-tip constraint for the stretcher 20, i.e. it is such as to oppose a vertical thrust directed upwards.

For example, the second coupling 322 is configured so as to be releasable from the release arrangement of the stretcher 20, i.e., from the first pin 265 (in the passage from the retracted position to the extracted position thereof, when the first pin 265 is at, i.e., horizontally aligned and at a predetermined axial distance, to a release appendage of the second coupling 322, at least when it couples the coupling head 260).

The support coupling 32, for example, has an axial length substantially less than half of the length of the slide 312 to which it is fixed, for example equal to ¼ of the length of the slide 312.

The support coupling 32 has a front (open) end arranged proximal to the rear opening of the ambulance V and an opposing rear end, defined by the rear wall, arranged proximal to the driver's cab of the ambulance V.

For example, the support coupling 32 is configured to slide (with free sliding, i.e., not actuated) along the slide 312 between two end positions, including one front end position, wherein, for example, the rear end of the support coupling 32 is placed substantially at the front end of the slide 312, and one rear end position, wherein, for example, the front end of the support coupling 32 is placed substantially at the rear end of the slide 312.

Between the two end positions, the coupling element 32 travels substantially ¾ of the length of the slide 312.

At least one between the slide 312 and the support coupling 32 further comprises one or more coupling elements 323, interposed between the slide 312 and the support coupling 32, configured to (temporarily) stop the support coupling 32 in corresponding axial stop stations along the travel between the two end positions and/or at each of said end positions.

In particular, the slide 312 has a rear coupling element 323 configured to (temporarily) stop the support coupling 32 in the rear end position and a front coupling element 323 configured to (temporarily) stop the support coupling 32 in the front end position.

For example, the coupling elements 323 are configured to be releasable from the release arrangement of the stretcher 20, i.e., from the second pin 267 (in the passage from the retracted position to the extracted position thereof, when the second pin 267 is at, i.e., superimposed in plan, to a release appendage of the coupling element 323 which emerges above the support coupling 32, at least when it couples the slide 312) and/or from cam elements 31 fixed to the fixed rail 310 and intended to come into contact with the coupling element 323 during the sliding of the slide 312 on the fixed rail 310 from the front end position to the rear end position.

The rear coupling element 323 is, for example, released by the second pin 267.

The front coupling element 323 is, for example, released by means of such cam elements (i.e. a linear cam).

The loading/unloading apparatus 30 may comprise at least a first sensor configured to detect when the slide 312 is in its rear end position and/or in its front end position (with respect to the fixed rail 310) and/or a second sensor configured to detect when the support coupling 32 is in its front end position and/or in its rear end position (with respect to the slide 312).

In addition, the loading/unloading apparatus may comprise a further electronic control unit (not shown) also having an interface module, e.g. defined by a visual/acoustic beacon and/or configured to connect to the control module 27 (i.e. to the electronic control unit 272 and/or to the user interface 271) of the stretcher 20, e.g. wirelessly.

In light of that described above, the operation of the stretcher 20 is the following.

During the handling of the stretcher 20, with the front wheels 221 and the rear wheels 231 in rolling rest on a rest plane, whether defined by the ground or by the loading plane L or otherwise, whether horizontal or inclined with respect to the horizontal, the control module 27 is configured to actuate the handling arrangement, i.e., the second front actuator 251 and/or the second rear actuator 252, so as to keep the first pivot axis P1 and/or the second pivot axis P2 always orthogonal to said rest plane, for example whatever angular position is assumed by one between the pair of front legs 22, around the first rotation axis R1, and the pair of rear legs 23, around the second rotation axis R2, with respect to the other between the pair of rear legs 23, around the second rotation axis R2, and the pair of front legs 22, around the first rotation axis R1.

Therefore, both when the rest plane is horizontal (and the support frame, i.e. its rest platform, is horizontal or inclined to the horizontal) and when the rest plane is inclined with respect to the horizontal (and the support frame, i.e. its rest platform, is horizontal or inclined with respect to the horizontal), the first pivot axis P1 and the second pivot axis P2 are always kept orthogonal to said rest plane by the control module 27.

In particular, the control module 27 is configured to always keep the first pivot axis P1 and the second pivot axis P2 orthogonal to the plane in which the revolution axes of the front wheels 221 and of the rear wheels 231 lie.

In detail, the electronic control unit 272 is configured to perform the steps of:

- detecting a first front angle value by means of the first front angle sensor S1 and a first rear angle value by means of the first rear angle sensor S2;
- determining a first front compensation angle value and a first rear compensation angle value on the basis of the first front angle value and of the first rear angle value detected; and
- commanding each second front actuator 251 to perform a compensation rotation (around the first oscillation axis O1) of the respective front wheel holder frame 220 by the determined first front compensation angle value and/or each second rear actuator 252 to perform a compensation rotation (around the second oscillation axis O2) of the respective rear wheel holder frame 230 by the determined first rear compensation angle value.

Advantageously, the determination step comprises calculating the first front compensation angle value and the second rear compensation angle value by means of the following formula:

$$\gamma=90°-\beta-\xi\text{; and} \quad \text{a)}$$

$$\theta=90°-\alpha+\xi \quad \text{b)}$$

wherein $\gamma$ is the first rear compensation angle, $\beta$ is the first rear angle value, $\theta$ is the first front compensation angle, $\alpha$ is the first front angle value and $\xi$ is the inclination angle of the support frame with respect to the rest plane.

The inclination angle $\xi$ of the support frame with respect to the rest plane is calculated as a function of the first front angle value $\alpha$ and of the first rear angle value $\beta$, preferably calculated with the following formula:

$$\xi=\tan^{-1}[(s*\cos(\beta)+s*\cos(\alpha)+i)/(s*\text{sen}(\beta)-s*\text{sen}(\alpha)], \quad \text{c)}$$

wherein s is a length of each leg of the pair of front legs 22 (e.g. calculated from the first rotation axis R1 to the revolution axis of the respective rear wheel 221) and each leg of the pair of rear legs 23 (e.g. calculated from the second rotation axis R2 to the revolution axis of the respective rear wheel 231), and i is an interaxis between the first rotation axis R1 and the second rotation axis R2.

The aforesaid functions/formulas are stored in the memory modules of the electronic control unit 272.

In light of the above, the operation of the system 10 is as follows.

The electronic control unit 272 of the stretcher 20 is configured to perform (and/or assist in performing) a sequence of loading the stretcher 20 onto the loading surface L of the ambulance V, i.e., on the loading/unloading apparatus 30.

While performing the loading sequence, the operator may (or must) hold down a loading button and/or initiate a loading sequence via the user interface 271, the release of such a button safely locks any handling of the stretcher 20.

First, an operator (or the electronic control unit of the loading/unloading apparatus) checks that the slide 312 is in its rear end position and locked therein by the rear coupling element 313 and the support coupling 32 is in its rear end position and locked therein by the rear coupling element 323.

When the loading sequence is activated, first the support frame 21 of the stretcher 20 is brought to a predetermined loading height by actuating the first front actuator 241 and/or the second rear actuator 242.

This height is configured so that the coupling head 260 is at a height greater than the lower wall of the support coupling 32 (but less than the maximum height of the rear wall thereof).

At this point, the operator guides the stretcher 20 so as to bring the coupling head 260 within the support coupling 32, for example guided by the lead-in side walls thereof.

When the coupling head 260 enters the support coupling 32 it is pressed by the operator against the rear wall thereof (and/or against the second coupling 322), and this pressure brings the coupling head 260 from its front end stroke to its rear end stroke.

When the coupling head 260 reaches its rear end stroke, the first limit switch sensor S10 detects this position and, for example, the first proximity sensor S9 recognises that the coupling head 260 is in abutment against the rear wall of the support coupling 32 (and not against an occasional obstacle), consequently, the electronic control unit 271 detects the correct positioning of the coupling head 260 in the support coupling 32 based on the (electrical) signal received by the first limit switch sensor S10.

At this point, the electronic control unit 272 gives its consent to the next steps of the loading sequence.

In particular, the electronic control unit 272 commands the first front actuator 241 and the first rear actuator 242 so as to lower the stretcher 20, i.e. the support frame 21 thereof, vertically.

When the coupling head 260 is pressed by the lowering against the lower wall of the support coupling 32 within the coupling seat 320 thereof, such pressure brings the coupling head 260 from its lower end stroke to its upper end stroke.

When the coupling head 260 reaches its upper end stroke, the second limit switch sensor S11 detects this position and, consequently, the electronic control unit 272 detects the correct positioning of the coupling head 260 in the support coupling 32 based on the (electrical) signal received by the second limit switch sensor S11.

In practice, the lifting of the coupling head 260 from the lower end stroke to the upper end stroke is indicative of (a height of the support frame 21 and/or) a load bearing on the coupling body 26 (i.e. on the coupling head) detected by means of the second limit switch sensor S11.

In fact, when the load bearing on the coupling head 260 is lower than a predetermined loading value, the coupling head 260 does not reach the upper end stroke, whereas when instead the load bearing on the coupling head 260 exceeds or equals the predetermined loading value, the coupling head 260 reaches the upper end stroke.

When the first limit switch sensor S10 and the second limit switch sensor S11 detect that both the rear end stroke and the upper end stroke of the coupling head 260 have been reached, the coupling head 260 has entered the coupling seat 320 and is retained therein between the first coupling 321 and the second coupling 322.

The electronic control unit 272 is configured to query the third distance sensor S12, in order to verify the correct alignment/parallelism of the stretcher 20 (i.e. the support frame thereof) with respect to the guide 31.

At this point, the electronic control unit 272, when it receives the signal from the second limit switch sensor S11, is configured to operate the lifting of the pair of front legs 22

(up to the raised angular end stroke position), by actuating the first front actuator 241, based on the indicative signal detected.

The electronic control unit 272, moreover, is configured to determine an inclination of the support frame 21 with respect to the slide 312 (during the lifting of the pair of front legs 22), for example by means of the third distance sensor S12 and, to command the lifting/lowering of the pair of rear legs 23, by actuating the first rear actuator 242, to keep the support frame 21 parallel to the rest plane/ground (and/or to the loading surface L).

When the pair of front legs 22 is in its raised angular end stroke position, the electronic control unit 272 can first confirm/verify the reaching thereof by querying the first front angle sensor S1.

In addition, the electronic control unit 272 is configured to command and actuate the unlocking arrangement, for example by commanding the second pin 267 to move to its extracted position, so as to unlock the locking arrangement, i.e. the rear coupling element 232 (to allow the support coupling 32 to slide on the slide 312 towards its front end position).

The operator can then push the stretcher 20 forward.

As soon as the advancement of the stretcher 20 begins, the electronic control unit 272 can verify that the slide 312 is free to slide on the fixed rail 310, for example by means of the second distance sensor S8, and commands the second pin 267 to return to its retracted position.

At this point, the operator can push the stretcher 20 horizontally until the support coupling 32 reaches its front end position.

When the support coupling 32 reaches its front end position on the slide 312 it unlocks (by means of a special mechanism) the coupling element 313 allowing the slide 312 to slide on the fixed rail 310 (from the front end position to the rear end position).

At this point, the electronic control unit 272 checks the position of the stretcher with respect to the loading surface L, in particular, it queries the first distance sensor S7.

In particular, the electronic control unit 272 on the basis of the signal received from the first distance sensor S7 determines if/when the pair of front legs 22 are fully loaded onto (and superimposed on) the loading surface L, i.e. if at least the front half of the stretcher 20 is fully loaded onto (and superimposed on) the loading surface L.

Once the electronic control unit 272 has determined that the front half of the stretcher 20 is fully loaded onto (and superimposed on) the loading surface L, it is configured to command the lifting of the pair of rear legs 23 (by detaching them from the ground), by actuating the first rear actuator 242, up to their raised angular end stroke position.

When the pair of rear legs 23 is in its raised angular end stroke position, the electronic control unit 272 can first confirm/verify the reaching thereof by querying the first front angle sensor S2.

When the pair of rear legs 23 is raised from the ground, the load of the stretcher is supported by the loading surface L and by the support coupling 32 (i.e., by the second coupling 322, which has an anti-tipping function).

Furthermore, the intermediate coupling element 313 prevents the slide 312 and the stretcher 20 loaded thereon from sliding in the direction of approach to the rear end position.

When the pair of rear legs 23 is in its raised angular end stroke position, the operator can advance the stretcher 20 (by pushing it horizontally), sliding it until the slide 312 is brought to its front end position and locked there by the coupling element 313 (and the support coupling 32 is already in its front end position).

In this position, the stretcher 20 couples, through its coupling portions 210, with the safety hooks 311 of the guide 31 (retaining the support element 32 in its front end position and the slide 312 in its front end position).

The electronic control unit 272 is configured to detect the successful and correct coupling between the coupling portions 210 and the safety hooks 311, for example by querying each second proximity sensor S13 and by receiving from it a respective signal of successful coupling.

For example, the electronic control unit 272 is configured to finish the loading sequence on the basis of a signal emitted and received by each second proximity sensor S13 and indicative of the successful coupling.

The electronic control unit 272 of the stretcher 20 is configured to perform (and/or assist in performing) a sequence of unloading the stretcher 20 from the loading surface L of the ambulance V, i.e., from the loading/unloading apparatus 30.

While performing the unloading sequence, the operator may (or must) hold down an unloading button and/or initiate an unloading sequence via the user interface 271, the release of such a button safely locks any handling of the stretcher 20.

First, the operator and/or electronic control unit 272 mechanically releases the coupling portions 210 from the safety hooks 311.

The electronic control unit 272 is configured to detect the successful and correct release between the coupling portions 210 and the safety hooks 311, for example by querying each second proximity sensor S13 and by receiving from it a respective signal of successful release.

At this point, the operator pulls the stretcher 20 axially and posteriorly with respect to the ambulance V until the slide 312 is constrained by the intermediate coupling element 313 (which locks its sliding towards the rear end position).

At this point, the electronic control unit 272 checks the position of the stretcher with respect to the loading surface L, in particular, it queries the first distance sensor S7.

In particular, the electronic control unit 272 on the basis of the signal received from the first distance sensor S7 determines if/when the pair of rear legs 23 are fully unloaded from (misaligned in plan from) the loading surface L, or if at least the rear half of the stretcher 20 is fully unloaded from (and misaligned in plan from) the loading surface L.

Once the electronic control unit 272 has determined that the rear half of the stretcher 20 is fully unloaded from (and misaligned in plan from) the loading surface L, the same electronic control unit 272 is configured to command the lowering of the pair of rear legs 23 (until the rear wheels 231 contact the ground), by actuating the first rear actuator 242.

The electronic control unit 272 is configured to determine a correct rest on the ground of the rear wheels 231 based on a signal received from a sensor of the sensor arrangement, for example from the rear pressure sensor S15 or from the third distance sensor S12 or from the inclinometer S16.

For example, the electronic control unit 272 can be configured to detect, via the rear pressure sensor S15, a pressure value (in the hydraulic circuit of the first rear actuator 242) and compare this pressure value with a reference value thereof.

If the pressure value exceeds this reference value, the electronic control unit 272 is configured to determine the correct rest on the ground of the rear wheels 231.

Alternatively or additionally, the electronic control unit 272 may be configured to detect via the third distance sensor S12 and/or via the inclinometer S16 a change in inclination of a portion of the stretcher 20 (e.g. of the support frame 21) and determine the correct rest on the ground of the rear wheels 231 as a function or based on the detected change in inclination.

Once the correct rest on the ground of the rear wheels 231 has been determined, the electronic control unit is configured to stop the lowering of the pair of rear legs 23 (by stopping the first rear actuator 241).

At this point, the electronic control unit 272 is configured to command and actuate the unlocking arrangement, for example by commanding the second pin 267 to move to its extracted position, so as to unlock the locking arrangement, i.e. the intermediate coupling element 313 (to allow the slide 312 to slide on the fixed rail towards its rear end position).

The operator, therefore, can pull the stretcher 20 and then the slide 312 towards the rear end position and, the cam element 314 on the fixed rail 310 releases the front locking element 323 allowing the support coupling 32 to be able to move towards the rear end position.

When the support coupling 32 (and the slide 312) arrives at its rear end position and is locked therein by the front coupling element 323, the electronic control unit 272 is configured to detect this position, for example by querying the second distance sensor S8 (which detects the distance of the stretcher 20 from the ground).

At this point, the electronic control unit 272 is configured to command the lowering of the pair of front legs 22 by actuating the first front actuator 241.

The electronic control unit 272 is, for example, configured to stop the lowering of the pair of front legs 22 as a function of a signal received from the second limit switch sensor S11.

In particular, the lowering of the pair of front legs 22 (when they start to touch the ground) causes the lowering of the coupling head 260 from the upper end stroke to the lower end stroke and this lowering is indicative of (a height of the support frame 21 and/or) a load no more bearing on the coupling body 26 (i.e. on the coupling head) detected by means of the second limit switch sensor S11.

In fact, when the load bearing on the coupling head 260 is lower than a predetermined loading value, the coupling head 260 moves to its lower end stroke.

In this position, the load of the stretcher 20 placed on the pair of front legs 22 (and pair of rear legs 23) and frees the coupling head 26.

In addition, the electronic control unit 272 is configured to command and actuate the unlocking arrangement, for example by commanding the first pin 265 to move to its extracted position, so as to unlock the coupling between the coupling head 260 and the coupling seat 320, i.e. by unlocking the second coupling 322, so as to be able to free the stretcher 20 from the loading/unloading apparatus 30 and freely move it.

The invention thus conceived is susceptible to many modifications and variants, all falling within the same inventive concept.

Moreover, all the details can be replaced by other technically equivalent elements.

In practice, any materials and also any contingent shapes and sizes may be used, depending on the needs, without departing from the scope of protection of the following claims.

The invention claimed is:

1. An ambulance stretcher, which comprises:

a support frame for supporting a patient;

a pair of front legs, each having a front wheel;

a pair of rear legs, each having a rear wheel;

an actuation arrangement provided with a front actuator, which moves the pair of front legs and which interconnects the support frame and the pair of front legs, and a rear actuator, which moves the pair of rear legs and which connects the support frame and the pair of rear legs; and a front coupling body connected to a front end of the support frame;

a controller of the coupling body comprising at least a first sensor connected to the coupling body and configured to detect a correct positioning of the coupling body in a respective support coupling of an automatic loading/unloading apparatus of an ambulance, and at least a second sensor connected to the coupling body configured to detect a load bearing on the coupling body;

at least one release arrangement arranged at the front end of the support frame and configured to operate a release between the coupling body and the support coupling of the loading/unloading apparatus of an ambulance; and an electronic control unit operatively connected to the actuation arrangement, to the release arrangement and to the controller and configured to actuate one of the actuation arrangement and the release arrangement as a function of a signal received from at least one of the first sensor and the second sensor of the controller.

2. The stretcher according to claim 1, wherein the coupling body comprises a spherical or hemispherical coupling head arranged on a vertical median plane of the support frame.

3. The stretcher according to claim 1, the coupling body is movable with respect to the support frame with respect to at least a first degree of translational freedom substantially parallel to the support frame, between two horizontal end stroke positions, including one front end stroke and one rear end stroke, and at least a second degree of translational freedom substantially orthogonal to the support frame, between two horizontal end stroke positions, including one lower end stroke and one upper end stroke.

4. The stretcher according to claim 3, wherein the coupling body is movable from the front end stroke position to the rear end stroke position in contrast to a first spring and is movable from the lower end stroke position to the upper end stroke position in contrast to a second spring.

5. The stretcher according to claim 3, wherein the first sensor is a first switch configured to detect when the coupling body is in its rear end stroke position and/or the second sensor is a second switch configured to detect when the coupling body is in its upper end stroke position.

6. The stretcher according to claim 1, which comprises an operator interface and at least one stretcher operating handle that are connected to a rear end of the support frame, wherein the electronic controller is operationally connected to the operator interface in order to receive commands therefrom and/or provide information to be made available to an operator.

7. A system for loading/unloading an ambulance stretcher onto/from an ambulance loading surface, wherein the system comprises:

a loading/unloading apparatus for a stretcher that can be associated with the loading surface, wherein the loading/unloading apparatus comprises:

at least one guide fixed to the loading surface;

a support coupling slidable along the guide fixed to the loading surface between a rear position, wherein the support coupling is proximal to a rear opening of the ambulance, a front position, wherein the support coupling is distal from the rear opening; and a temporary locking arrangement connected to at least one between the support coupling and the guide and configured to temporarily lock the support coupling to the guide in at least one of the front position and the rear position or both; and a stretcher, wherein the stretcher comprises:

a support frame for supporting a patient;

a front coupling body connected to a front end of the support frame and configured to be coupled to the support coupling of the loading/unloading apparatus;

a pair of front legs, each having a front wheel;

a pair of rear legs, each having a rear wheel;

an actuation arrangement provided with a front actuator, which moves the pair of front legs and which interconnects the support frame and the pair of front legs, and a rear actuator, which moves the pair of rear legs and which connects the support frame and the pair of rear legs;

a controller of the coupling body provided with at least a first sensor connected to the coupling body and configured to detect a correct positioning of the coupling body in the respective support coupling of the loading/unloading apparatus, and at least a second sensor connected to the coupling body configured to detect a load bearing on the coupling body;

at least one release arrangement arranged at the front end of the support frame and configured to operate a release between the coupling body and the support coupling of the loading/unloading apparatus; and at least one electronic controller operatively connected to the actuation arrangement, to the release arrangement and to the controller and configured to actuate one of the actuation arrangement and the release arrangement as a function of a signal received from at least one between the first sensor and the second sensor of the controller.

8. The system according to claim 7, wherein the electronic controller is configured to perform a sequence of loading the stretcher onto the loading surface, wherein the loading sequence comprises the steps of:

detecting the correct positioning of the coupling body in the support coupling by the first sensor, when the support coupling is in its rear position;

if a correct positioning has been detected, detecting a signal indicative a load bearing on the coupling body by the second sensor; and operating the front actuator to raise the front pair of front legs on the basis of the indicative signal detected.

9. The system according to claim 8, wherein the stretcher comprises an unlocking arrangement configured to unlock the temporary locking arrangement; and wherein the electronic controller is operatively connected to the unlocking arrangement and is configured to command the unlocking arrangement to unlock the locking arrangement when the front legs are in a raised end stroke position.

10. The system according to claim 9, wherein the stretcher comprises a distance sensor arranged inferiorly to the support frame between the pair of front legs and the pair of rear legs, wherein the distance sensor is configured to detect the position of the support frame with respect to the rear opening of the ambulance; and wherein the electronic controller is operatively connected to the distance sensor and is configured to operate the rear actuator to raise the pair of rear legs based on a signal emitted by the distance sensor.

11. The system according to claim 10, wherein the guide is provided with safety couplings configured to couple at least one of the coupling portions of the stretcher, when the coupling body engages the support coupling and the support coupling is in the front position and locked therein by the locking arrangement; and wherein the stretcher comprises a sensor arrangement arranged inferiorly to the support frame, wherein the sensor arrangement is configured to detect a successful coupling of the coupling portions of the stretcher to the safety couplings of the guide and/or of the locking arrangement between the guide and the support coupling;

and wherein the electronic controller is operatively connected to the sensor arrangement to finish the loading sequence based on a signal emitted by the sensor arrangement.

12. The system according to claim 7, wherein the electronic controller is configured to perform a sequence of unloading the stretcher from the loading surface, wherein the unloading sequence comprises at least the steps of:

detecting a signal indicative of a load bearing on the coupling body by the second sensor, when the coupling body is coupled to the support coupling and the support coupling is in its rear position; and operating the release arrangement to operate a release between the coupling body and the support coupling based on the indicative signal detected.

13. The system according to claim 7, wherein the support coupling comprises a seat provided with a rear wall, two lead-in side walls and a lower wall, wherein the lead-in side walls preferably converge with each other towards the rear wall.

14. The system according to claim 1, wherein the support coupling comprises at least one coupling seat contained between the lead-in side walls, the rear wall and the lower wall, wherein the coupling seat is configured to releasably snap into the coupling body of the stretcher and be actuated by the release arrangement for releasing the coupling body from the support coupling.

15. The system according to claim 7, wherein the loading/unloading apparatus comprises a further electronic controller operable to at least one position sensor associated with at least one of the guide and the support coupling and configured to detect a position of the support coupling in at least one between the rear position and the front position or both, wherein the further electronic controller is configured to:

detect a position of the support coupling in at least one between the rear position and the front position or both by the position sensor;

determine a correct positioning of the support coupling in at least one between the rear and front positions or both; and signal the correct positioning determined to least one operator interface connected to at least one between the loading/unloading apparatus and the stretcher.

* * * * *